United States Patent
Song

(10) Patent No.: US 9,509,522 B2
(45) Date of Patent: Nov. 29, 2016

(54) FORWARDING MULTICAST DATA PACKETS

(71) Applicant: Hangzhou H3C Technologies Co., Ltd., Hangzhou, Zhejiang (CN)

(72) Inventor: Yubing Song, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 119 days.

(21) Appl. No.: 14/493,984

(22) Filed: Sep. 23, 2014

(65) Prior Publication Data

US 2015/0085640 A1   Mar. 26, 2015

(30) Foreign Application Priority Data

Sep. 24, 2013  (CN) .......................... 2013 1 0440051
Sep. 24, 2013  (CN) .......................... 2013 1 0440087

(51) Int. Cl.
| | |
|---|---|
| H04L 12/28 | (2006.01) |
| H04L 12/18 | (2006.01) |
| H04L 12/66 | (2006.01) |
| H04L 12/46 | (2006.01) |
| H04L 12/741 | (2013.01) |
| H04L 12/753 | (2013.01) |
| H04L 12/24 | (2006.01) |
| H04L 12/761 | (2013.01) |

(52) U.S. Cl.
CPC ............ *H04L 12/185* (2013.01); *H04L 12/18* (2013.01); *H04L 12/1886* (2013.01); *H04L 12/4633* (2013.01); *H04L 12/4641* (2013.01); *H04L 12/66* (2013.01); *H04L 45/48* (2013.01); *H04L 45/74* (2013.01); *H04L 41/0668* (2013.01); *H04L 45/16* (2013.01)

(58) Field of Classification Search
CPC combination set(s) only.
See application file for complete search history.

(56) References Cited

U.S. PATENT DOCUMENTS

| | | | |
|---|---|---|---|
| 8,054,835 B2 | 11/2011 | Ooghe et al. | |
| 2011/0299414 A1* | 12/2011 | Yu ...................... | H04L 12/4641 370/252 |
| 2011/0299528 A1 | 12/2011 | Yu et al. | |
| 2012/0294308 A1 | 11/2012 | Cai et al. | |
| 2013/0088951 A1 | 4/2013 | Liu | |
| 2013/0294221 A1 | 11/2013 | Parameswaran et al. | |
| 2013/0294448 A1 | 11/2013 | Mentze et al. | |

(Continued)

FOREIGN PATENT DOCUMENTS

| | | |
|---|---|---|
| CN | 102377584 | 3/2012 |
| WO | WO2011156256 | 12/2011 |

OTHER PUBLICATIONS

Zhang et al, TRILL Resilient Distribution Trees, Internet-Draft, 18 pages, Jun. 2012.*

(Continued)

*Primary Examiner* — Frank Duong
(74) *Attorney, Agent, or Firm* — Hewlett Packard Enterprise Patent Department

(57) ABSTRACT

A gateway routing bridge of a data center, obtains nicknames of designated routers (DR) of a multicast group in each virtual local area network (VLAN); calculates distribution trees rooted at each DR; receiving a multicast data packet from a multicast source of the multicast group which inside the data center; and sends the multicast data packet on the distribution tree rooted at the DR which corresponds to a multicast address and a VLAN identifier (VLAN ID) of the multicast data packet.

18 Claims, 10 Drawing Sheets

(56) References Cited

U.S. PATENT DOCUMENTS

2014/0146822 A1* 5/2014 Janardhanan ....... H04L 12/4625
370/395.53
2014/0258485 A1* 9/2014 Yang ....................... H04L 41/12
709/223

OTHER PUBLICATIONS

"IP Multicast Best Practices for Enterprise Customers", Cisco Systems, Inc., Oct. 2009.

* cited by examiner

US 9,509,522 B2

FORWARDING MULTICAST DATA PACKETS

BACKGROUND

Currently, very large layer 2 (VLL2) networking technology has been implemented in data center (DC) networks. VLL2 networking technologies such as the transparent interconnection of lots of links (TRILL), the shortest path bridging (SPB), and Vxlan (Virtual Extended VLAN) have been developed and have been standardized by different standards organizations. TRILL is a standard developed by the Internet Engineering Task Force (IETF), and SPB is a standard developed by the Institute of Electrical and Electronics Engineers (IEEE).

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
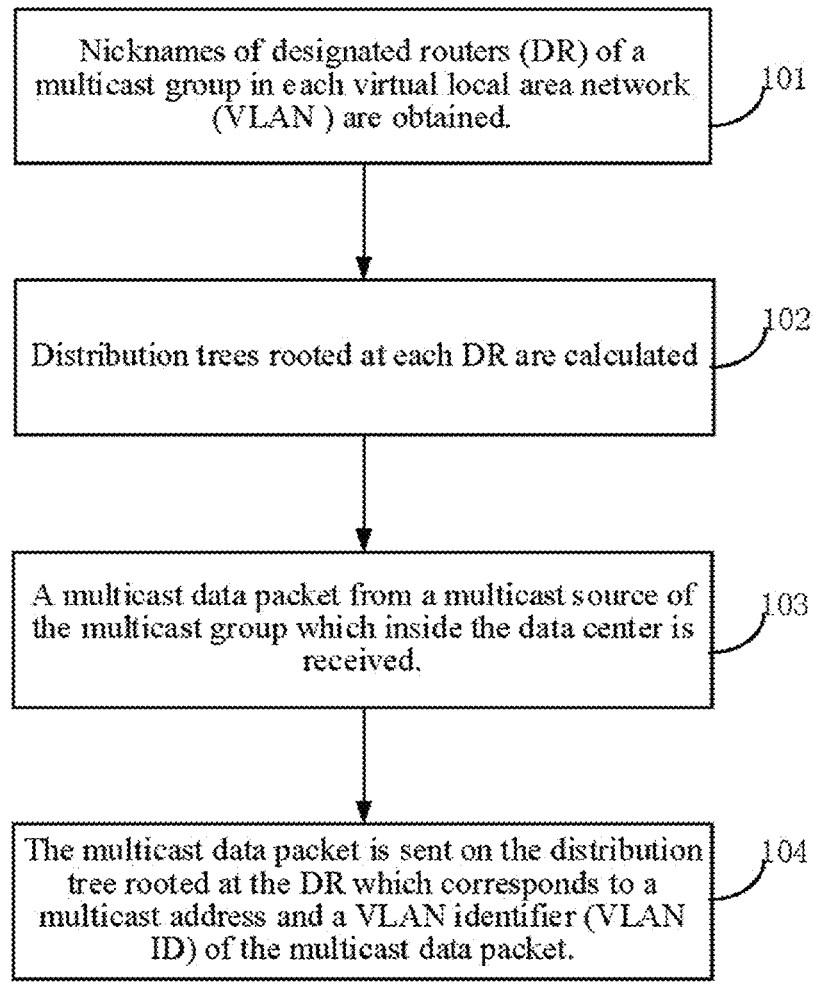
FIG. 1 is a schematic diagram illustrating a process of forwarding a multicast data packet, according to an example of the present disclosure.

FIG. 1 is a schematic diagram illustrating a process of forwarding a multicast data packet implemented by a gateway routing bridge (RB) in a TRILL network inside a data center, according to an example of the present disclosure. The packet forwarding process includes following blocks.

At block 101, nicknames of designated routers (DR) of a multicast group in each virtual local area network (VLAN) are obtained.

At block 102, distribution trees rooted at each DR are calculated.

At block 103, a multicast data packet from a multicast source of the multicast group which is inside the data center is received.

At block 104, the multicast data packet is sent on the distribution tree rooted at the DR which corresponds to a multicast address and a VLAN identifier (VLAN ID) of the multicast data packet.

In an example, in a very large layer 2 (VLL2) network of a data center, such as the transparent interconnection of lots of links (TRILL) network, a multicast group may has different designated router (DR) in different virtual local area network (VLAN). In an example of the present disclosure, a DR router port may be defined to mean a local port on a TRILL path on a TRILL multicast tree reaching a DR. A gateway router port may be defined to mean a local port on a TRILL path on a TRILL multicast tree reaching a gateway.

Figure 2:
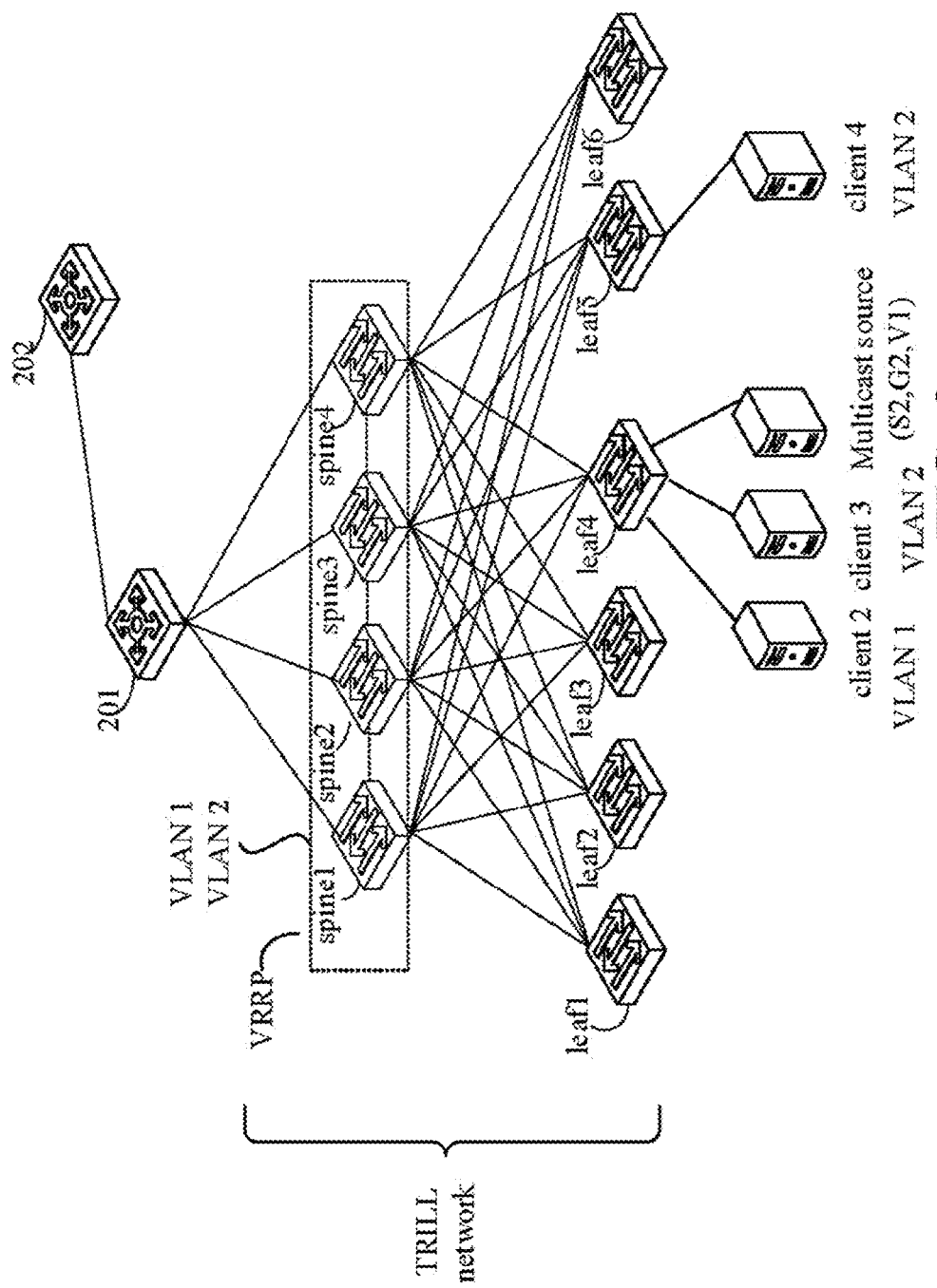
FIG. 2 is a schematic diagram illustrating a network structure according to an example of the present disclosure.

As shown in FIG. 2, four gateway routing bridges (RBs) at a core layer of a data center, i.e., the RBs spine1-spine4, may perform neighbor discovery and election of a major device based on a virtual router redundancy protocol (VRRP). The four RBs may form one VRRP router, which may be configured as a gateway of virtual local area network 1 (VLAN1) and VLAN2. The RBs spine1-spine4 may all be in an active state, and may route multicast data packets between the VLAN1 and the VLAN2.

An Internet group management protocol snooping (IGSP) protocol may be run both on the gateway RBs spine1-spine4 and on the non-gateway RBs leaf1-leaf6 at the access layer. An Internet group management protocol (IGMP) protocol and a PIM protocol may also be run on the RBs spine1-spine4.

The RB spine3 is a designated router (DR) of a multicast group G2 in the VLAN1, the RB spine4 is a DR of the multicast group G2 in the VLAN2.

The RB spine3 is a backup designated router (BDR) of the multicast group G2 in the VLAN2, and the RB spine4 is a backup DR of the multicast group G2 in the VLAN1.

A Bidirectional Forwarding Detection (BFD) session of the PIM protocol is established between the RBs spine3-spine4. If the RB spine3 may detect, by the BFD session, that the RB spine4 is failed, the RB spine3 may switch to be the DR of the multicast group G2 in the VLAN2. The RB spine4 may perform similar processing.

Client2 and client3 connected to the RB leaf4 are receivers of the multicast group G2 in the VLAN1 and the VLAN2, respectively. Client4 connected to the RB leaf5 is a receiver of the multicast group G2 in the VLAN2. A multicast source (S2, G2, V1) is connected to the RB leaf4.

For convenience of description, six ports on the RB spine1 that may respectively connect the RB leaf1, the RB leaf2, the RB leaf3, the RB leaf4, the RB leaf5, and the RB leaf6 may be named as spine1_P1, spine1_P2, spine1_P3, spine1_P4, spine1_P5, and spine1_P6, respectively. The ports of the RBs spine2~spine4 that may respectively connect the RBs leaf1-leaf6 may be named according to the manners described above.

Four ports on the RB leaf1 that may respectively connect the RB spine1, the RB spine2, the RB spine3, and the RB spine4 may be named as leaf1_P1, leaf1_P2, leaf1_P3, and leaf1_P4, respectively. The ports of the RB leaf2~the RB leaf6 that may respectively connect the RBs spine1-spine4 may be named according to the manners described above.

Three ports on the RB leaf4 that may respectively connect the client2, the client3, and the multicast source (S2, G2, V1) may be named as leaf1_Pa, leaf1_Pb, and leaf1_Pc, respectively. A port on the RB leaf5 that may connect to a client4 may be named as leaf5_Pa.

The RBs spine1-spine4 and the RBs leaf1-leaf6 may know that the gateways of the VLAN1 and the VLAN2 in the TRILL network may be the RBs spine1-spine4, the DR of the multicast group G2 in the VLAN may be the RB spine3, and the DR of the multicast group G2 in the VLAN2 may be the RB spine4.

The RBs spine1-spine4 may advertise, in a manner of notification, gateway information and DR information of multicast group in each VLAN within the TRILL network to all RBs. In an example, the RB spine1 may advertise, in the TRILL network, that a nickname of a gateway of the VLAN1 and the VLAN2 may be a nickname of the RB spine1. The RB spine2 may advertise, in the TRILL network, that a nickname of a gateway of the VLAN1 and the VLAN2 may be a nickname of the RB spine2. The RB spine3 may advertise, in the TRILL network, that a nickname of a gateway of the VLAN1 and the VLAN2 may be a nickname of the RB spine3, a multicast source of the multicast group G2 is located inside the VLAN1 of the data center, and a nickname of the DR of the multicast group G2 in the VLAN1 may be the nickname of the RB spine3. The RB spine4 may advertise, in the TRILL network, that a nickname of a gateway of the VLAN1 and the VLAN2 may be a nickname of the RB spine4, and a nickname of the DR of the multicast group G2 in the VLAN2 may be the nickname of the RB spine4. The RBs spine1-spine4 may advertise the information described above through a link state advertisement (LSA) of an intermediate system to intermediate system routing protocol (IS-IS).

The RBs spine1-spine4 and the RBs leaf1-leaf6 may respectively calculate TRILL trees each of which rooted at one DR, i.e. one TRILL multicast tree rooted at the RB spine3 which is the DR of the multicast group G2 in the VLAN1, and another TRILL multicast tree rooted at the RB spine4 which is the DR of the multicast group G2 in the VLAN2.

Figure 3A:
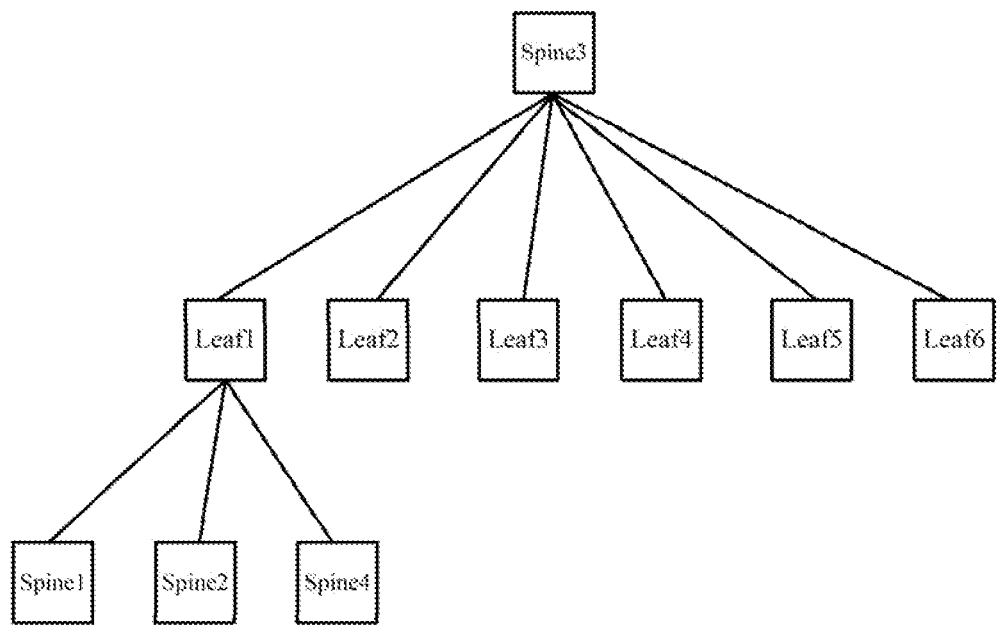
FIG. 3A and FIG. 3B are schematic diagrams respectively illustrating a TRILL multicast tree in FIG. 2, according to an example of the present disclosure.
Figure 3B:
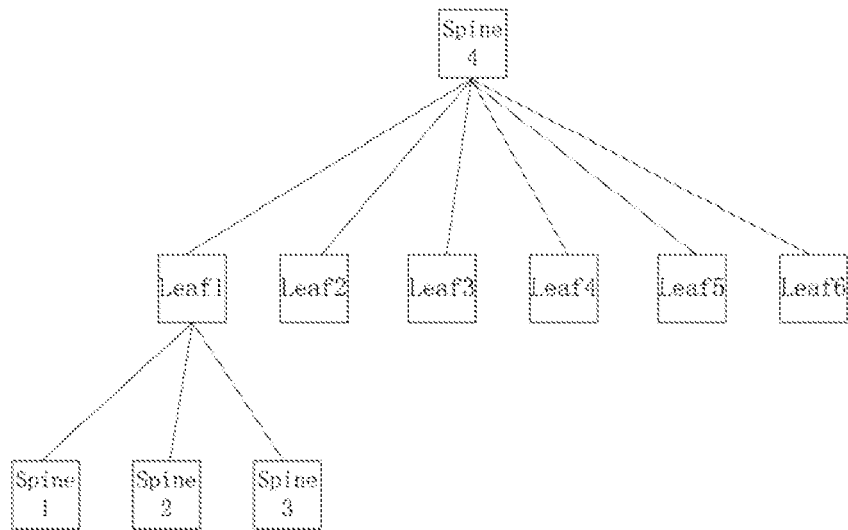

FIG. 3A and FIG. 3B are schematic diagrams respectively illustrating a TRILL multicast tree in FIG. 2. The RBs spine1-spine4 and the RBs leaf1-leaf6 may respectively calculate, based on the TRILL multicast trees as shown in FIG. 3A and FIG. 3B, DR router ports and gateway router ports.

In an example of the present disclosure, a DR router port may be defined to mean a local port on a TRILL path on a TRILL multicast tree reaching a DR. A gateway router port may be defined to mean a local port on a TRILL path on a TRILL multicast tree reaching a gateway.

In the TRILL multicast tree as shown in FIG. 3A, the local port of the RB spine1 on a TRILL path from the RB spine1 to the RB spine3 may be the port spine1_P, i.e., the DR router port of the RB spine1 is the port spine1_P1; the local port of the RB spine1 on three TRILL paths, which are respectively from the RB spine1 to the RB spine2, the RB spine3, and the RB spine4, may be the port spine1_P1, i.e., the gateway router port of the RB spine1 is the port spine1_P1. In the TRILL multicast tree as shown in FIG. 3B, the local port of the RB spine1 on a TRILL path from the RB spine1 to the RB spine4 may be the port spine1_P1, i.e., the DR router port of the RB spine1 is the port spine1_P 1; the local port of the RB spine1 on three TRILL paths, which are respectively from the RB spine1 to the RB spine2, the RB spine3, and the RB spine4, may be the port spine1_P1, i.e., the gateway router port of the RB spine1 is the port spine1_P1.

Router ports calculated by the RB spine1 based on the TRILL multicast trees as shown in FIG. 3A, and FIG. 3B may be as shown in Table 1.1.

TABLE 1.1

| VLAN | Multicast group | DR router port | Gateway router port |
|---|---|---|---|
| V1 | G2 | spine1_P1 | spine1_P1 |
| V2 | G2 | spine1_P1 | spine1_P1 |

Router ports calculated by the RB spine2 based on the TRILL multicast trees as shown in FIG. 3A, and FIG. 3B may be as shown in Table 1.2.

TABLE 1.2

| VLAN | Multicast group | DR router port | Gateway router port |
|---|---|---|---|
| V1 | G2 | spine2_P1 | spine2_P1 |
| V2 | G2 | spine2_P1 | spine2_P1 |

Router ports calculated by the RB spine3 based on the TRILL multicast trees as shown in FIG. 3A, and FIG. 3B may be as shown in Table 1.3.

TABLE 1.3

| VLAN | Multicast group | DR router port | Gateway router port |
|---|---|---|---|
| V1 | G2 | null | spine3_P1 |
| V2 | G2 | spine3_P1 | spine3_P1 |

Router ports calculated by the RB spine4 based on the TRILL multicast trees as shown in FIG. 3A, and FIG. 3B may be as shown in Table 1.4.

TABLE 1.4

| VLAN | Multicast group | DR router port | Gateway router port |
|---|---|---|---|
| V1 | G2 | spine4_P1 | spine4_P1 |
| V2 | G2 | null | spine4_P1 |

Router ports calculated by the RB leaf4 based on the TRILL multicast trees as shown in FIG. 3A, and FIG. 3B may be as shown in Table 1.5.

TABLE 1.5

| VLAN | Multicast group | DR router port | Gateway router port |
|---|---|---|---|
| V1 | G2 | leaf4_P3 | leaf4_P3 |
| V2 | G2 | leaf4_P4 | leaf4_P4 |

Router ports calculated by the RB leaf5 based on the TRILL multicast trees as shown in FIG. 3A, and FIG. 3B may be as shown in Table 1.6.

TABLE 1.6

| VLAN | Multicast group | DR router port | Gateway router port |
|---|---|---|---|
| V1 | G2 | leaf5_P3 | leaf5_P3 |
| V2 | G2 | leaf5_P4 | leaf5_P4 |

Figure 4:
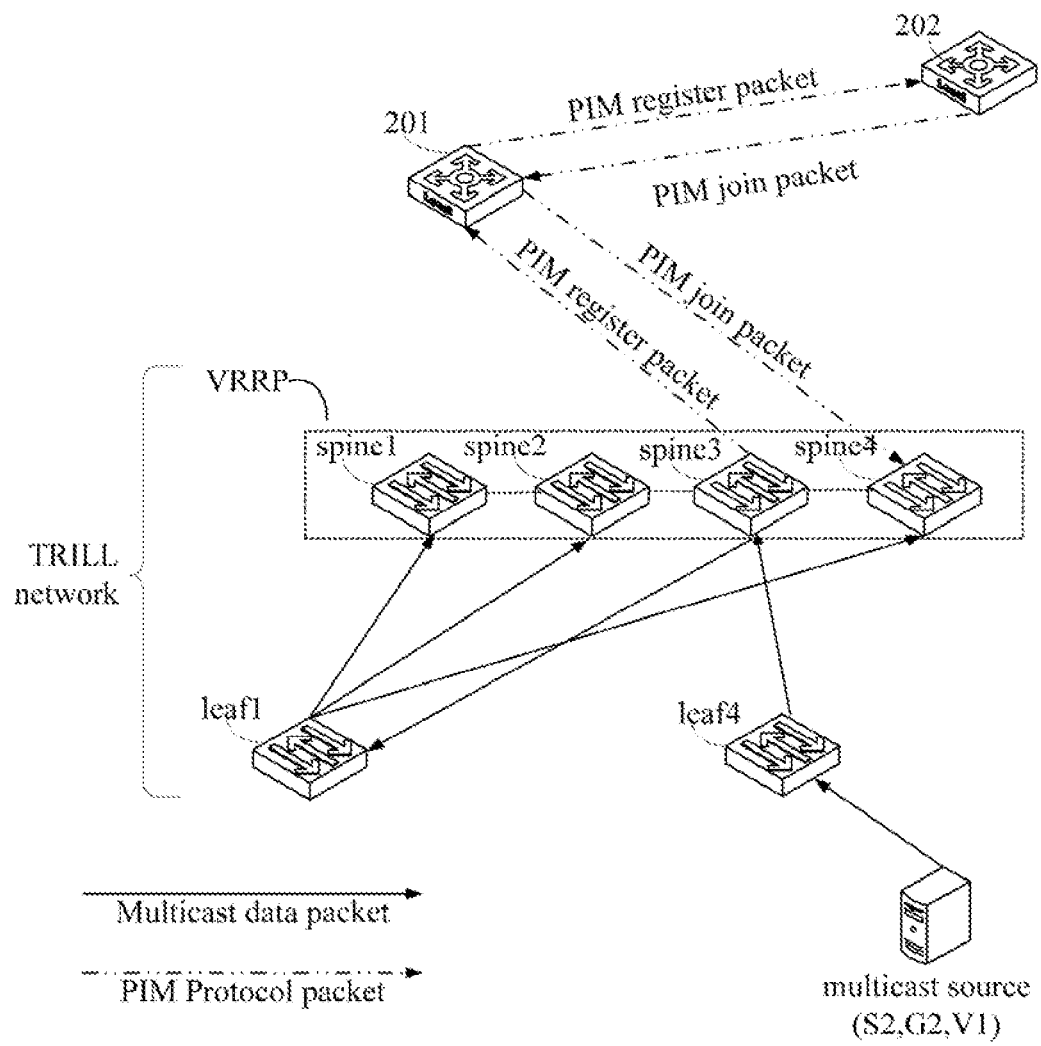
FIG. 4 is a schematic diagram illustrating a process of sending a protocol independent multicast (PIM) register packet by a DR of a data center in FIG. 2 to an external rendezvous point (RP) router, according to an example of the present disclosure.

FIG. 4 is a schematic diagram illustrating a process of sending a protocol independent multicast (PIM) register packet to an external rendezvous point (RP) router as shown in FIG. 2, according to an example of the present disclosure. The PIM register packet may be encapsulated from a multicast data packet sent by the multicast source (S2, G2, V1) located inside the data center.

The multicast source (S2, G2, V1) of the multicast group G2 sends a multicast data packet.

The multicast source (S2, G2, V1) of the multicast group G2 may send a multicast data packet. The RB leaf4 may receive the multicast data packet, and may not find an entry matching with (VLAN1, G2). The RB leaf4 may configure a new (S2, G2, V1) entry, and may add the port leaf4_P3, which is both the gateway router port and the DR router port, to an outgoing interface to the newly-configured (S2, G2, V1) entry. The RB leaf4 may send, through the gateway router port and the DR router port leaf4_P3, the multicast data packet.

Due to the multicast source of the multicast group G2 is inside the data center, the RB leaf4 may send the multicast data packet to the gateways of the VLAN1. One RB of the gateways of the VLAN1 may send, according a PIM join packet received from the outside of the data center, the multicast data packets of the multicast group G2 to the outside of the data center.

The RB spine3 may receive the multicast data packet, and may not find an entry matching with the multicast address G2. The RB spine3 may configure a (S2, G2, V1) entry, and may add membership information (VLAN1, spine3_P1) to an outgoing interface of the newly-configured (S2, G2, V1) entry, in which the VLAN1 may be a virtual local area network identifier (VLAN ID) of the multicast data packet, and spine3_P1 may be a gateway router port. In the present disclosure, VLAN1 may represent the virtual local area network 1 or may represent the virtual local area network identifier (VLAN ID) of the virtual local area network 1 of the multicast data packet. The RB spine3, as the DR of the multicast group G2 of the VLAN1, may encapsulate the multicast data packet into a PIM register packet, and may send the PIM register packet to an upstream multicast router, i.e., an outgoing router 201. The outgoing router 201 may send the PIM register packet towards the RP router 202.

The RB spine3 may duplicate and send, based on the newly-added membership information (VLAN1, spine3_P1), the data packet having the multicast address G2 and VLAN1. In the present disclosure, G2 may represent a multicast group or a multicast address of a multicast group G2.

The RB leaf1 may receive the multicast data packet at the port leaf1_P3, and may not find an entry matching with (VLAN1, G2). The RB leaf1 may configure a (S2,G2,V1) entry, and may add the ports leaf1_P1, leaf1_P2, leaf1_P3, and leaf1_P4, which are the DR router port and the gateway router ports, to an outgoing interface of the newly-configured entry. In the TRILL multicast trees as shown in FIG. 3A, four TRILL paths from the RB leaf1 to the RBs spine1-spine4 may respectively be leaf1→spine1, leaf1→spine2, leaf1→spine3, and leaf1→spine4. As such, gateway router ports calculated by the RB leaf1 are the ports leaf1_P1, leaf1_P2, leaf1_P3, and leaf1_P4.

The RB leaf1 may send, respectively through the ports leaf1_P1, leaf1_P2, and leaf1_P4 in the outgoing interface of the newly configured entry, the multicast data packet to the RBs spine1, spine2, and spine4. The RB leaf1 may not send the multicast data packet via the DR router port leaf1_P3 listed in the outgoing interface due to the incoming interface of the received multicast data packet also being outgoing interface port leaf1_P3 in the newly-configured entry.

Each of the RBs spine1, spine2, and spine4 may receive the multicast data packet having the multicast address G2 and the VLAN1, and may not find an entry matching with the multicast address G2. The RB spine1 may configure a (S2, G2, V1) entry, and may add membership information (VLAN1, spine1_P1) to an outgoing interface of the newly-configured entry, in which VLAN1 may be a VLAN ID of the multicast data packet, and the port spine1_P1 is both the DR router port and the gateway router port. The RB spine2 may configure a (S2, G2, V1) entry, and may add membership information (VLAN1, spine2_P1) to an outgoing interface of the newly-configured entry, in which VLAN1 may be a VLAN ID of the multicast data packet, and the port spine2_P is both the DR router port and the gateway router port of the VLAN1. The RB spine4 may configure a (S2, G2, V1) entry, and may add membership information (VLAN1, spine4 P1) to an outgoing interface of the newly-configured entry, in which VLAN1 may be a VLAN ID of the multicast data packet, and the port spine4_P1 may be the DR router port and the gateway router port. The RBs spine1, spine2, and spine4 may not duplicate the multicast data packets based on their newly added membership information, which is the same as the incoming interfaces of the incoming multicast data packet having the multicast address G2 and the VLAN1. In this manner, the multicast data packets from the multicast source (S2, G2, V1) are sent on the tree (a distribution tree shown in the FIG. 3.A) rooted at the RB spine 3 which is the DR corresponds to a multicast address and a VLAN identifier (VLAN ID) of the multicast data packet from the multicast source (S2, G2, V1).

In the external data center, the RP router 202 may receive and decapsulate the PIM register packet to get the multicast data packet, and may send the multicast data packet to a receiver of the multicast group G2 that is located outside of the data center. The RP router 202 may send, according to a source IP address of the PIM register packet, a PIM (S2, G2) join packet to join the multicast group G2. The PIM join packet may be transmitted hop-by-hop to the outgoing router 201 of the data center. The outgoing router 201 may receive the PIM join packet, and may select the RB spine4 from the RBs spine1-spine4, which are the next-hops of the VLAN1. The outgoing router 201 may send a PIM join packet to the RB spine4 to join the multicast group G2. In an example, the outgoing router 201 may perform HASH calculation according to the PIM join packet requesting to join the multicast group G2, and may select the next hop based on a result of the HASH calculation.

The RB spine4 may receive, through a local port spine4_Pout (which is not shown in FIG. 4), the PIM join packet to join the multicast group G2, find the (S2, G2, V1) entry based on the multicast address G2, and add membership information (VLAN100, spine4_Pout) to an outgoing interface of the matching entry, in which VLAN100 may be a VLAN ID of the PIM join packet, and the port spine4_Pout may be a port receiving the PIM join packet. In an example, if the next hop selected by the outgoing router 201 is the RB spine1, the RB spine1 may add associated membership information according to the PIM join packet received.

The Client2 Joins the Multicast Group G2

In an example, the client2 which belongs to VLAN1 may send an IGMP report packet requesting to join the multicast group (*, G2).

The RB leaf4 may receive the IGMP report packet joining the multicast group G2 from the client2, find the (S2, G2, V1) entry matching with (VLAN1, G2), and add a membership port leaf4_Pa to the outgoing interface of the matching entry.

The RB leaf4 may encapsulate a TRILL header and a next-hop header for the received IGMP report packet to encapsulate the IGMP report packet as a TRILL-encapsulated IGMP report packet, in which an ingress nickname of the TRILL header may be a nickname of the RB leaf4, and an egress nickname of the TRILL header may be a nickname of the RB spine3 which is the DR of multicast group G2 in the VLAN1. The RB leaf4 may send the TRILL-encapsulated IGMP report packet through the DR router port leaf4_P3. The RB leaf4 configures an aging timer for the membership port leaf4_Pa.

The RB spine3 may receive the TRILL-encapsulated IGMP report packet, may find the (S2, G2, V1) entry matching the multicast address G2. The RB spine3 may add, based on the VLAN1 and spine3_P4, in which the VLAN1 may be a VLAN ID of the IGMP report packet, and the port spine3_P4 (which is a port receiving the TRILL-format IGMP report packet) may be a membership port, membership information to an outgoing interface. The RB spine3 may configure an aging timer for the membership port spine3_P4 which is a port receiving the TRILL-encapsulated IGMP report packet.

The RB spine3, as the DR of the multicast group G2 in the VLAN1, may send a PIM join packet to the RP router 202 of the multicast group G2. The RB spine3 may send the PIM join packet to an upstream multicast router, i.e., an outgoing router 201. The outgoing router 201 may configure a (S2, G2) entry and send the PIM join packet towards the RP router 202.

The Client3 Joins a Multicast Group G2

In an example, the client3 which belongs to VLAN2 may send an IGMP report packet requesting to join the multicast group (*, G2).

The RB leaf4 may receive the IGMP report packet joining the multicast group G2 through the port leaf4_Pb, and may not find an entry matching with (VLAN2, G2). The RB leaf4 may configure a (*, G2, V2) entry, add leaf4_Pb (which is a port receiving the IGMP report packet) as a membership port to an outgoing interface of the newly-configured entry.

The RB leaf4 may encapsulate the IGMP report packet as a TRILL-encapsulated IGMP report packet, in which an ingress nickname of a TRILL header may be a nickname of the RB leaf4, and an egress nickname of the TRILL header may be a nickname of the RB spine4 (which is the DR of the multicast group G2 in the VLAN2). The RB leaf4 may send the TRILL-encapsulated IGMP report packet through DR router port leaf4_P4. The RB leaf4 may configure an aging timer for the membership port leaf4_Pb. In this manner, the multicast data packets are sent on the tree (a distribution tree shown in the FIG. 3.B) rooted at the RB spine 4 which is the DR corresponds to a multicast address and a VLAN identifier (VLAN ID) of the multicast data packet.

The RB spine4 may receive, through a local port spine4_P4, the TRILL-encapsulated IGMP report packet, find the (S2, G2, V1) entry based on the multicast address G2, and add membership information (VLAN2, spine4_P4) to an outgoing interface of the matching entry, in which VLAN2 may be a VLAN ID of the IGMP report packet, and the port spine4_P4 may be a membership port receiving the TRILL-encapsulated IGMP report packet.

The RB spine4, as the DR of the multicast group G2 in the VLAN2, may send a PIM join packet to the RP router 202 of the multicast group G2. The RB spine4 may send the PIM join packet to an upstream multicast router, i.e., an outgoing router 201. The outgoing router 201 may configure a (S2, G2) entry and send the PIM join packet towards the RP router 202.

The Client4 Joins a Multicast Group G2

In an example, the client4 which belongs to the VLAN2 may send an IGMP report packet requesting to join the multicast group (*, G2).

The RB leaf5 may receive the IGMP report packet joining the multicast group G2 through the port leaf5_Pa, and may not find an entry matching with (VLAN2, G2). The RB leaf5 may configure a (*, G2, V2) entry, add the port leaf5_Pa (which is a port receiving the IGMP report packet) as a membership port to an outgoing interface of the newly-configured entry.

The RB leaf5 may encapsulate the IGMP report packet as a TRILL-encapsulated IGMP report packet, in which an ingress nickname of a TRILL header may be a nickname of the RB leaf5, and an egress nickname of the TRILL header may be a nickname of the RB spine4 (which is the DR of the multicast group G2 in the VLAN2). The RB leaf5 may send the TRILL-encapsulated IGMP report packet through the DR router port leaf5_P4. The RB leaf5 may configure an aging timer for the membership port leaf5_Pa.

The RB spine4 may receive, through a local port spine4_P5, the TRILL-encapsulated IGMP report packet, find the (S2, G2, V1) entry based on the multicast address G2, and add membership information (VLAN2, spine4_P5) to an outgoing interface of the matching entry, in which VLAN2 may be a VLAN ID of the IGMP report packet, and spine4_P5 may be a membership port receiving the TRILL-encapsulated IGMP report packet.

Figure 5:
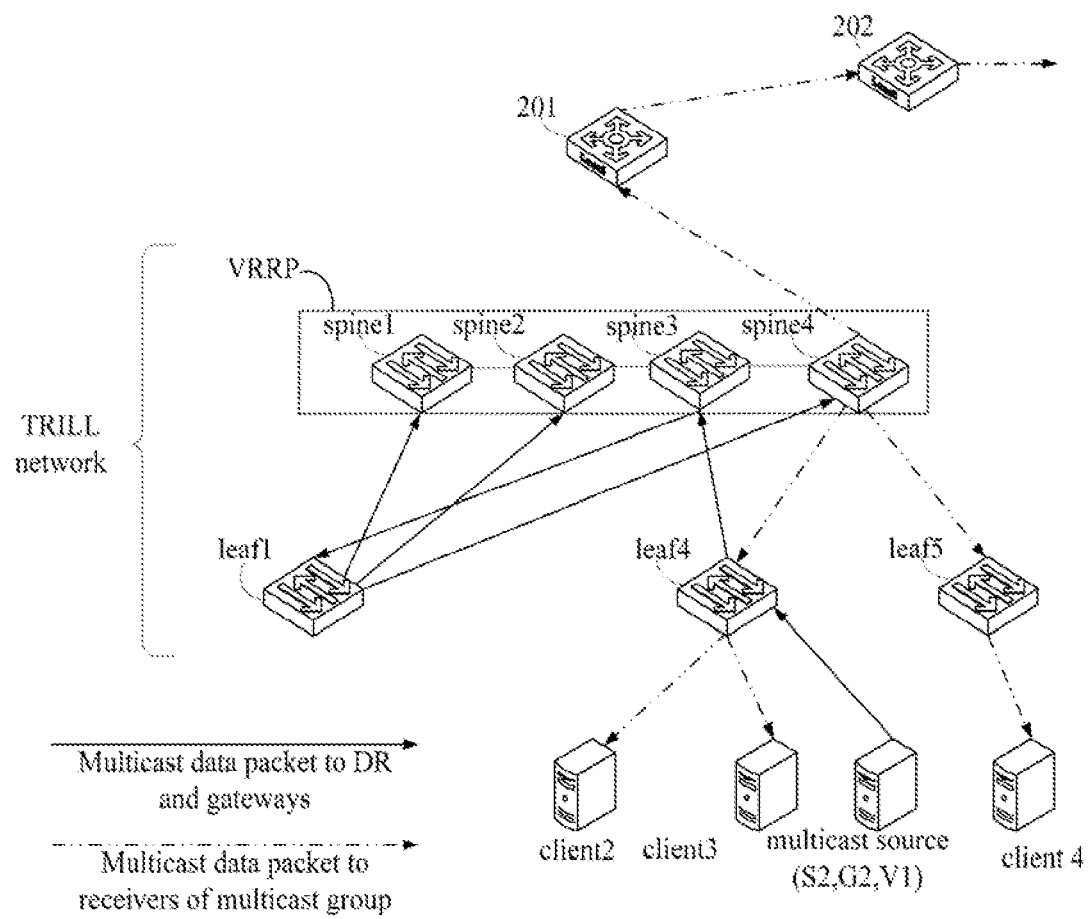
FIG. 5 is a schematic diagram illustrating a process of sending a multicast data packet of an internal multicast source in FIG. 2 to an external RP router and an internal multicast group receiving end, according to an example of the present disclosure.

FIG. 5 is a schematic diagram illustrating a process of sending a multicast data packet of an internal multicast source in FIG. 2 to an external RP router and an internal multicast group receiving end, according to an example of the present disclosure.

In this case, the multicast source (S2, G2, V1) of the multicast group G2 may send a multicast data packet to the RB leaf4. The RB leaf4 may find the local entry matching with (VLAN1, G2), and may send the multicast data packet to the client2 and the RB spine3 through the port leaf4_Pa and the port leaf4_P3, respectively.

The RB spine3 may receive the multicast data packet, find a local entry matching with the multicast address G2, and duplicate and send the multicast data packet of the multicast group G2 based on the membership information (VLAN1, spine3_P1). The RB spine3 may encapsulate the multicast data packet as a PIM register packet and may send the PIM register packet towards the RP router 202.

The RB leaf1 may receive the multicast data packet of the multicast group G2 in VLAN1, and may find an entry matching with (VLAN1, G2). The RB leaf1 may send, respectively through the gateway router ports leaf1_P1, leaf1_P2, and leaf1_P4, the data packet to the RBs spine1, spine2, and spine4.

The RB spine4 may receive the multicast data packet having the multicast address G2 and VLAN1, and may find the (S2, G2, V1) entry matching the multicast address G2. The RB spine4 may duplicate and send, based on the membership information (VLAN2, spine4 P4), (VLAN2, spine4_P5), and (VLAN100, spine4_Pout), the multicast data packet of the multicast group G2. Therefore, the RB spine4 may duplicate and send the multicast data packet of the multicast group G2 to the RB leaf4, the RB leaf5, and the outgoing router 201.

The outgoing router 201 sends multicast data packets toward the RP router 202. The RP router 202 may receive the multicast data packet; and may send to the RB spine 3 a PIM register-stop packet of the multicast group G2. The RB spine3 may receive the PIM register-stop packet, and stop sending the PIM register packet to the RP router 202.

The RB leaf4 may receive the multicast data packet of the multicast group G2, and may find an entry matching with (VLAN2, G2). The RB leaf4 may send the multicast data packet of the multicast group G2 to the client3 through the membership port leaf4_Pb of the outgoing interface.

The RB leaf5 may receive the multicast data packet of the multicast group G2, and may find an entry matching with (VLAN2, G2). The RB leaf5 may send the multicast data packet of the multicast group G2 to the client4 through the membership port leaf5_Pa of the outgoing interface.

As shown in FIG. 5, two TRILL multicast trees share the multicast data packet of the multicast group G2 in the VLAN1 and the VLAN2, respectively.

For a network apparatus whose forwarding chip may not possess sufficient processing capacity, it cannot perform layer-3 forwarding immediately after TRILL decapcasulation. When such network apparatus is used the gateway RBs, it sends multicast data packet decapsulated from TRILL packet to its loop back-interfaces first, and then performs layer-3 forwarding based on the multicast data packet which received at its loopback-interfaces. However, available user interfaces on such network apparatus are reduced due to some of the user interfaces are configured as loopback-interfaces, layer-3 forwarding capacity of such network apparatus might be restricted by the number of the loopback-interfaces.

In above examples, the non-gateway RBs of the access layer may send, in the TRILL network, a multicast data packet without encapsulating the multicast data packet into the TRILL-encapsulated format. The gateway RBs of the core layer may send, in three-layer forwarding and duplicating, a multicast data packet based on the VLAN ID, router port, and the VLAN ID and membership port. Thus, the gateway RBs do not have to implement TRILL decapsulation before performing layer-3 forwarding and TRILL encapsulation after performing layer-3 forwarding. In this way, the layer-3 forwarding capacity of the gateway RBs may be unaffected.

Processing for Responding to an IGMP General Group Query Packet

The RBs spine1-spine4 may elect an IGMP querier for each VLAN. However, IGMP queriers elected for different VLANs may be implemented by the same RB. In an example, the RBs spine1-spine4 may elect the RB spine1 as an IGMP querier within the VLAN1, and may elect the RB spine4 as an IGMP querier within the VLAN2.

In the example, the RBs spine1 and spine4 each may periodically send an IGMP general group query packet within the VLAN1 and the VLAN2, respectively. The RB spine1 and the RB spine4 each may respectively select a TRILL VLAN pruned tree to send the IGMP general group query packet, so as to ensure that the RBs spine1-spine4 and the RBs leaf1-leaf6 may respectively receive the IGMP general group query packet within the VLAN1 and the VLAN2.

In an example, the nickname of a root of a TRILL VLAN pruned tree may the nickname of the querier of the VLAN. The RB spine1 may send a TRILL-encapsulated IGMP general group query packet to the VLAN1, in which an ingress nickname may be a nickname of the RB spine1, and an egress nickname may be the nickname of the RB spine1, which is the root of the TRILL VLAN pruned tree. The RB spine4 may send a TRILL-encapsulated IGMP general group query packet to the VLAN2, in which an ingress nickname may be a nickname of the RB spine4, and an egress nickname may be the nickname of the RB spine4, which is the root of the TRILL VLAN pruned tree.

The RBs leaf1-leaf6 each may receive the TRILL-encapsulated IGMP general group query packet within the VLAN1 and the VLAN2, and may respectively send the IGMP general group query packet through a local port of the VLAN1 and a local port of the VLAN2 after implementing TRILL decapsulation.

Processing of the Client2 Responded the IGMP General Group Query Packets

In an example, the client2 may send, in response to receiving the IGMP general group query packet, an IGMP report packet. The RB leaf4 may receive, through the port leaf4_Pa, the IGMP report packet joining the multicast G2, reset the aging timer of membership port leaf4_Pa, may perform TRILL encapsulation to the IGMP report packet, and may send the TRILL-encapsulated IGMP report packet through which is the DR router port leaf4_P3 corresponding to (VLAN1, G2), to the RB spine3.

The RB spine3 may receive the TRILL-encapsulated IGMP report packet through the port spine3_P4, and reset the aging timer of the port spine3_P4.

Processing of the Client3 for Leaving a Multicast Group

In an example, the client3, which belongs to VLAN2, may send an IGMP leave packet.

The RB leaf4 may receive the IGMP leave packet from the client3, perform TRILL encapsulation to the IGMP leave packet, and may forward the TRILL-encapsulated IGMP leave packet through the DR router port leaf4_P4, corresponding to (VALN2, G2).

The RB spine4 may receive the TRILL-encapsulated IGMP leave packet through the port spine4_P4, and generate, based on the IGMP leave packet, an IGMP group specific query packet about the multicast group G2 and the VLAN2. The RB spine4 may perform TRILL encapsulation to the IGMP group specific query packet, send the TRILL-encapsulated IGMP group specific query packet through the port spine4_P4, which is the receiving port of the TRILL-encapsulated IGMP leave packet, and may reset the aging timer of the port spine4_4.

The RB leaf4 may receive the TRILL-encapsulated IGMP group specific query packet, and may analyze the IGMP group specific query packet to determine that the multicast group G2 in VLAN2 is to be queried. The RB leaf4 may send the IGMP group specific query packet through leaf4_Pb, which is the membership port of the outgoing interface of the (VLAN2, G2) entry. The RB leaf4 may reset a multicast group membership aging timer of the port leaf4_Pb.

The RB leaf4 may remove, in response to a determination that an IGMP report packet joining the group G2 is not received through the membership port leaf4_Pb within the configured time, the membership port leaf4_Pb from the (*, G2, V2) entry.

The RB spine4 may remove, in response to a determination that an IGMP report packet joining the group G2 is not received through the membership port spine4_P4 within the configured time, the member information (VLAN1, spine4_P4) from the outgoing interface of the (S2, G2, V1) entry.

Due to the multicast source of the multicast group is within the data center, the RBs do not remove all the DR router ports and the gateway router ports. Thus, when the RBs receive the multicast data packet sent from the multicast source within the data center, the RBs may forward the multicast data packet through the router ports and may not be regenerating the multicast entries.

Considering that a RB in the TRILL domain may be failed, examples of the present disclosure may also provide an abnormality processing mechanism to enhance the availability of the system.

In an example, when the upstream PIM link of the RB spine3 is failed, the RB spine3 may turn off the PIM neighbor relationships between the RB spine3 and other PIM neighbors outside the data center. The RB spine3 may immediately turn off all the IGMP functions and PIM multicast routing functions of downstream. The IGSP function of the VLAN may be remained to meet the needs for the transit nodes listening and maintaining the other router ports. Thus, the RB spine4 may switch to the DR of the multicast group G2 in the VLAN1.

Or, when the RB spine3 is failed, the RB spine4 may detect that the RB spine3 is failed by the BFD detection, and switch to the DR of the multicast group G2 in the VLAN1.

The RB spine4 may notify, in TRILL network, the RB spine3 which is the gateways of the VLAN1 and the VLAN2 is failed, the multicast source of the multicast group G2 is located inside the VLAN1 of the data center, and a nickname of a DR of the multicast group G2 in the VLAN1 may be a nickname of the RB spine4.

Under normal conditions, the RB spine3 and the RB spine4 may periodically advertise that the gateways of the VLAN1 and the VLAN2 are the RBs spine3 and spine4, respectively. When the RB spine3 is failed, it may not advertise the gateway information. Other RBs may determine, in response to a determination that the gateway information from the RB spine3 is not received within a configured aging time, that the RB spine3 is no longer a gateway of VLAN1.

The RBs spine1, spine2, and spine4 and the RBs leaf1-leaf6 may respectively recalculate a TRILL multicast tree of which a root is the RB spine4. According to the new TRILL multicast tree, the gateway RBs and the non-gateway RBs may recalculate a new DR router port and a new gateway router port, update the previous DR router port and the previous gateway router port in a local entry with the new gateway router port and the new gateway router port, and sent the multicast data packet through the router ports which are recalculated according to the new TRILL multicast tree.

In addition, on two TRILL multicast trees shown in FIG. 3A and FIG. 3B, each non-gateway RBs leaf1-leaf6 is directly connected to the DR via TRILL link. On the TRILL multicast tree of which a root is the DR, if each of the RBs leaf1-leaf6 is not directly connected to the DR, the non-gateway RBs leaf1-leaf6 at the access layer may still send the TRILL-encapsulated IGMP protocol packets through the DR router port. The RBs leaf1-leaf6 may add the local port of receiving the TRILL-encapsulated IGMP report packet as a membership port to an outgoing interface of an entry.

Similarly, on two TRILL multicast trees shown in FIG. 3A and FIG. 3B, the TRILL links between the RBs leaf1-leaf6 at an access layer and the DR are failed, then the RBs leaf1-leaf6 at the access layer are not directly connected to the DR. The RBs leaf1-leaf6 may recalculate a DR router port and a gateway router port, may update the DR router ports and the gateway router ports in a local entry based on the new router ports, may send the TRILL-encapsulated IGMP protocol packets through the new DR router ports, and may send the multicast data packet through the new DR router port and the new gateway router port.

The method of the present disclosure as shown in FIG. 2 to FIG. 5 may apply to IGMP v2 protocol and IGMP v3 protocol. For example, the method may apply to the gateway RBs spine1-spine4 under the PIM Source Specific Multicast (PIM-SSM) and IGMP v3 protocol. Under the IGMP v3/PIM-SSM environment, the RBs spine1-spine4 are still be handled in accordance with depicts shown in FIG. 2 to FIG. 5.

The RBs leaf1-leaf6 of the access layer may enable the analysis functionality of a packet. The RBs leaf1-leaf6 may receive the IGMP report packet sent from the client, in which the IGMP report packet may carry a plurality of multicast group records based on the IGMP v3 protocol, and may parse the plurality of multicast group records carried in the IGMP report packet, and may split the IGMP report packet into different IGMP report packets based on different roots of different multicast trees. That is, each IGMP report packet may carry the multicast group records corresponding to the same root of a multicast tree, may be encapsulated as a TRILL-encapsulated IGMP report packet and may be sent to the corresponding DR router port.

In IGMP v3 protocol, the end-station may not send the IGMP leave group packet. On the contrary, it may use the state change of a report packet of a membership to trig the DR to perform a group specific query or a group source specific query for keeping the membership ports of a local entry. In an example of the IGMP v3 protocol, an IGMP general group query packet is periodically sent from a querier, and the group specific query packet or the group source specific query packet is sent by the DR of the corresponding multicast group.

Figure 6:
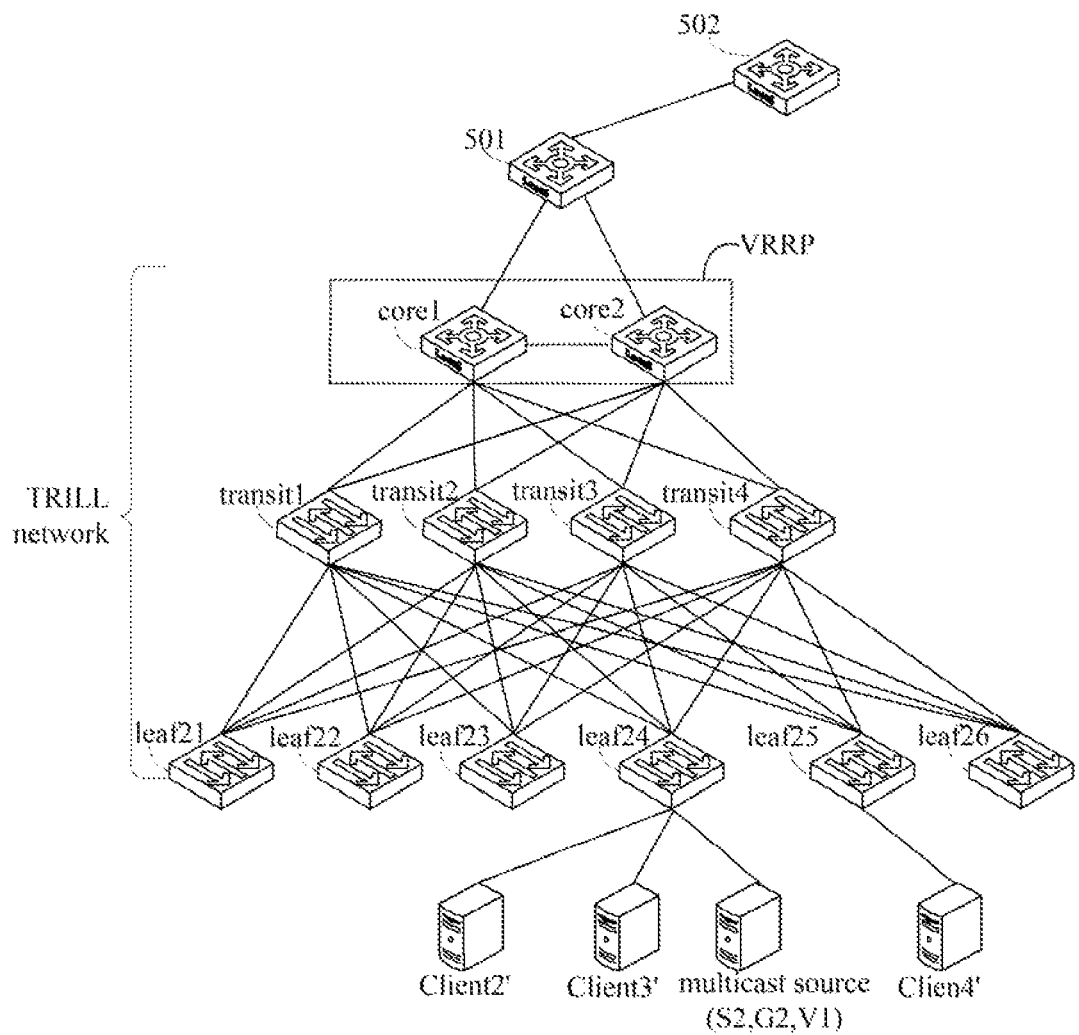
FIG. 6 is a schematic diagram illustrating a schematic diagram illustrating a network structure according to an another example of the present disclosure.

FIG. 6 is a schematic diagram illustrating a network structure according to another example of the present disclosure. The RBs core1-core2 may perform a neighbor discovery and election of a major device based on a virtual router redundancy protocol (VRRP). The RBs core1-core2 may form one VRRP router, which may be configured as a gateway of virtual local area network VLAN1 and VLAN2. The RBs core1-core2 may all be in an active state, and may route multicast data packets between the VLAN1 and the VLAN2.

An internet group management protocol snooping (IGSP) protocol may be run on the gateway RBs core1-core2 at a core layer, on the non-gateway RBs transit1-transit4 at an aggregation layer, and on the non-gateway RBs leaf21-leaf26 at the access layer. An internet group management protocol (IGMP) protocol and a PIM protocol may also be run on the RBs core1-core2.

The RB core1 is a DR of multicast group G2 in VLAN1. The RB core2 is a DR of multicast group G2 in VLAN2.

The RB core1 is a backup designated router (DR) of multicast group G2 in VLAN2, and the RB core2 is a backup DR of multicast group G2 in VLAN1.

A Bidirectional Forwarding Detection (BFD) session of the PIM protocol is established between the RBs core1-core2. If the RB core1 detects, by the BFD session, that the RB core2 is failed, the RB core1 may switch to be the DR of the multicast group G2 in VLAN2. The RB core2 performs similar processing.

Client2' and client3' connected to the RB leaf24 are the receivers of the multicast group G2 in the VLAN1 and the VLAN2, respectively. Client4' connected to the RB leaf25 is a receiver of the multicast group G2 in the VLAN2.

For convenience of description, four ports on the RB core1 that may respectively connect the RB transit 1, the RB transit2, the RB transit3, and the RB transit4 may be named as core1_P1, core1_P2, core1_P3, and core1_P6, respectively. Four ports on the RB core2 that may respectively connect the RB transit1, the RB transit2, the RB transit3, and the RB transit4 may be named as core2_P1, core2_P2, core2_P3, and core2_P4, respectively.

Two ports on the RB transit1 that may respectively connect the RB core1 and the RB core2 may be named as transit1_Pa, and transit1_Pb, respectively. The ports of the RBs transit2-transit4 that may respectively connect the RBs core1 and the RB core2 may be named according to the manners described above. Six ports on the RB transit1 that may respectively connect the RB leaf21, the RB leaf22, the RB leaf23, the RB leaf24, the RB leaf25, and the RB leaf26 may be named as transit1_P1, transit1_P2, transit1_P3, transit1_P4, transit1_P5, and transit1_P6, respectively. The ports of the RBs transit2-transit4 that may respectively connect the RBs leaf21-leaf26 may be named according to the manners described above.

Four ports on the RB leaf21 that may respectively connect the RB transit1, the RB transit2, the RB transit3, and the RB transit4 may be named as leaf21_P1, leaf21_P2, leaf21_P3, and leaf21_P4, respectively. The ports of the RBs leaf22-leaf26 that may respectively connect the RBs transit1-transit4 may be named according to the manners described above.

Three ports on the RB leaf24 that may respectively connect the client2', the client3', and the multicast source (S2, G2, V1) may be named as leaf24_Pa, leaf24_Pb, and leaf24_Pc, respectively. A port on the RB leaf25 that may connect to a client4 may be named as leaf25_Pa.

The RBs core1-core2, the RBs transit1-transit4, and the RBs leaf21-leaf26 may know that the gateways of the VLAN1 and the VLAN2 in the TRILL network may be the RB core1-core2, the DR of the multicast group G2 in the VLAN1 may be the RB core1, and the DR of the multicast group G2 in the VLAN2 may be the RB core2.

The RBs core1-core2 may advertise, in a manner of notification, gateway information and DR information of multicast group in each VLAN within the TRILL network to all RBs. In an example, the RB core1 may advertise, in the TRILL network, that nicknames of gateways of the VLAN1 and the VLAN2 may be a nickname of the RB core1, a multicast source of a multicast group G2 is located inside the VLAN1 of the data center, and a nickname of the DR of the multicast group G2 in the VLAN1 may be the nickname of the RB core1.

The RB core2 may advertise, in the TRILL network, that nicknames of gateways of the VLAN1 and the VLAN2 may be a nickname of the RB core2, and a nickname of the DR of the multicast group G2 in the VLAN2 may be the nickname of the RB core2.

The RBs core1-core2, the RBs transit1-transit4, and the RBs leaf21-leaf26 may respectively calculate TRILL multicast trees rooted at each DR.

Figure 7A:
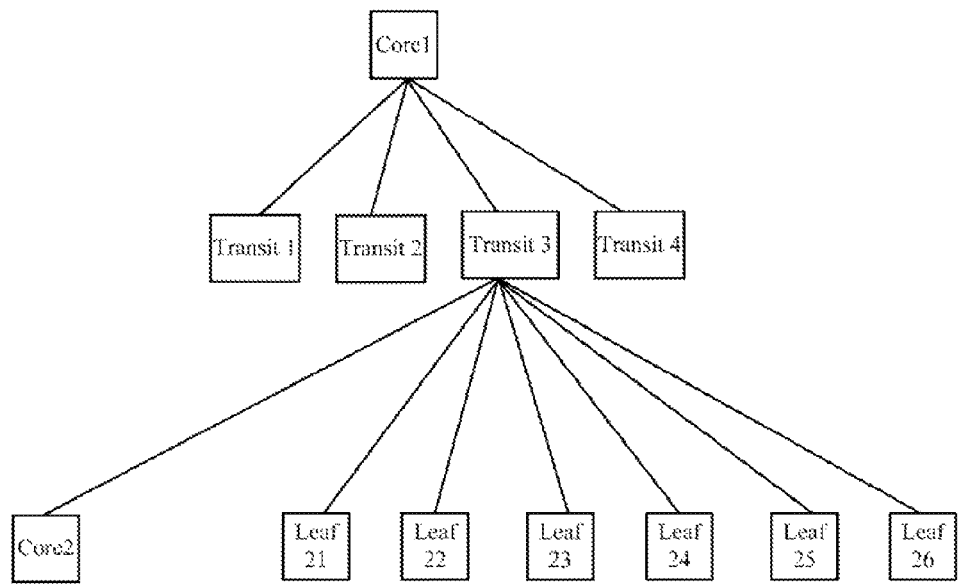
FIG. 7A and FIG. 7B are schematic diagrams respectively illustrating a TRILL multicast tree in FIG. 6, according to an example of the present disclosure.
Figure 7B:
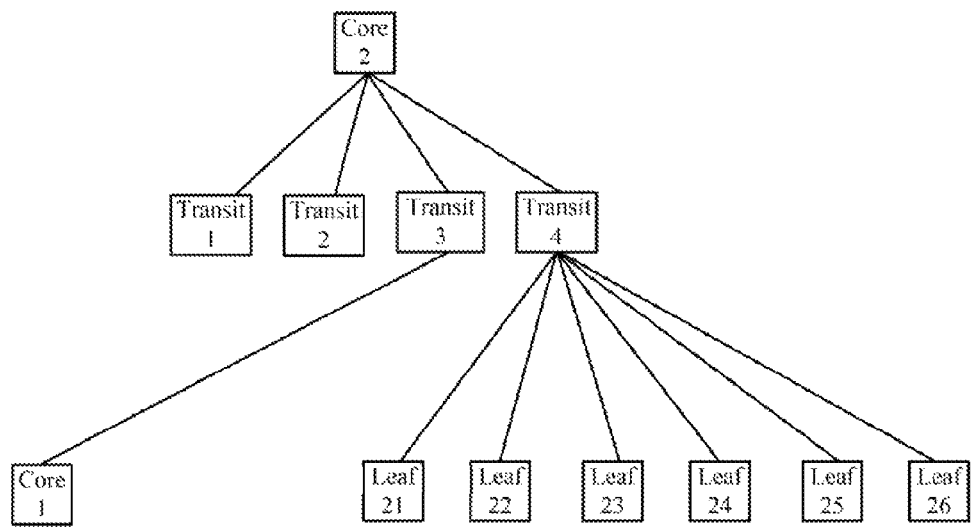

FIG. 7A and FIG. 7B are schematic diagrams respectively illustrating a TRILL multicast tree which is rooted at each DR, according to an example of the present disclosure The RBs core1-core2, the RBs transit1-transit4, and the RBs leaf2 1-leaf26 may respectively calculate, based on the TRILL multicast trees as shown in FIG. 7A and FIG. 7B, DR router ports and gateway router ports.

On the multicast tree as shown in FIG. 7A, a TRILL path from the RB core1 to itself may be through a loop interface, i.e. the DR router port may be null, and the local port of the RB core1 on a TRILL path from the RB core1 to the RB core2 may be the port core1_P3, i.e. the gateway. On the multicast tree as shown in FIG. 7B, a TRILL path from the RB core1 to itself may be through a loop interface. i.e. there is no router port towards the RB core1 itself; and the local port of the RB core1 on a TRILL path from the RB core1 to the RB core2 may be the port core1_P3, i.e. the port core1_P3 is the DR router port and the gateway router port of the RB core1.

Manners in which the router ports may be calculated by the RBs core1-core2, the RBs transit1-transit4 and the RBs leaf21-leaf26 based on the TRILL multicast trees as shown in FIGS. 7A and 7B may be similar to the manners described above, which are not repeated herein.

Router ports calculated by the RB core1 based on the TRILL multicast trees as shown in FIG. 7A, and FIG. 7B may be as shown in Table 3.1.

TABLE 3.1

| VLAN | Multicast group | DR router port | Gateway router port |
|---|---|---|---|
| V1 | G2 | null | core1_P3 |
| V2 | G2 | core1_P3 | core1_P3 |

Router ports calculated by the RB core2 based on the TRILL multicast trees as shown in FIG. 7A, and FIG. 7B may be as shown in Table 3.2.

TABLE 3.2

| VLAN | Multicast group | DR router port | Gateway router port |
|---|---|---|---|
| V1 | G2 | core2_P3 | core2_P3 |
| V2 | G2 | null | core2_P3 |

Router ports calculated by the RB transit1 based on the TRILL multicast trees as shown in FIG. 7A, and FIG. 7B may be as shown in Table 4.1.

TABLE 4.1

| VLAN | Multicast group | DR router port | Gateway router port |
|---|---|---|---|
| V1 | G2 | transit1_Pa | transit1_Pa |
| V2 | G2 | transit1_Pb | transit1_Pb |

Router ports calculated by the RB transit2 based on the TRILL multicast trees as shown in FIG. 7A, and FIG. 7B may be as shown in Table 4.2.

TABLE 4.2

| VLAN | Multicast group | DR router port | Gateway router port |
|---|---|---|---|
| V1 | G2 | transit2_Pa | transit2_Pa |
| V2 | G2 | transit2_Pb | transit2_Pb |

A Router ports calculated by the RB transit3 based on the TRILL multicast trees as shown in FIG. 7A, and FIG. 7B may be as shown in Table 4.3.

TABLE 4.3

| VLAN | Multicast group | DR router port | Gateway router port |
|---|---|---|---|
| V1 | G2 | transit3_Pa | transit3_Pa transit3_Pb |
| V2 | G2 | transit3_Pb | transit3_Pa transit3_Pb |

Router ports calculated by the RB transit4 based on the TRILL multicast trees as shown in FIG. 7A, and FIG. 7B may be as shown in Table 4.4.

TABLE 4.4

| VLAN | Multicast group | DR router port | Gateway router port |
|---|---|---|---|
| V1 | G2 | transit4_Pa | transit4_Pa |
| V2 | G2 | transit4_Pb | transit4_Pb |

Router ports calculated by the RB leaf24 based on the TRILL multicast trees as shown in FIG. 7A, and FIG. 7B may be as shown in Table 5.1.

TABLE 5.1

| VLAN | Multicast group | DR router port | Gateway router port |
|---|---|---|---|
| V1 | G2 | leaf24_P3 | leaf24_P3 |
| V2 | G2 | leaf24_P4 | leaf24_P4 |

Router ports calculated by the RB leaf25 based on the TRILL multicast trees as shown in FIG. 7A, and FIG. 7B may be as shown in Table 5.2.

TABLE 5.2

| VLAN | Multicast group | DR router port | Gateway router port |
|---|---|---|---|
| V1 | G2 | leaf25_P3 | leaf25_P3 |
| V2 | G2 | leaf25_P4 | leaf25_P4 |

Figure 8:
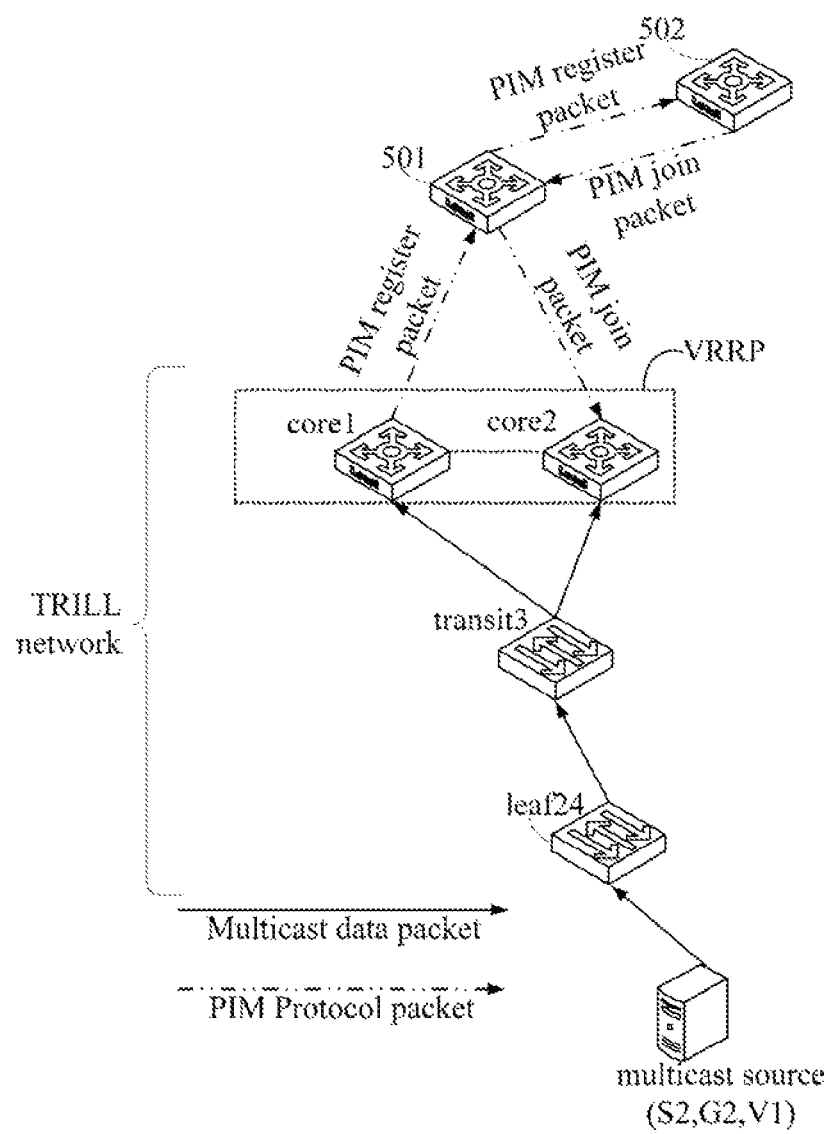
FIG. 8 is a schematic diagram illustrating a process of sending a protocol independent multicast (PIM) register packet by a DR of a data center in FIG. 6 to an external rendezvous point (RP) router, according to an example of the present disclosure.

FIG. 8 is a schematic diagram illustrating a process of sending a protocol independent multicast (PIM) register packet by a DR of a data center in FIG. 6 to an external rendezvous point (RP) router, according to an example of the present disclosure.

The multicast source (S2, G2, V1) of the multicast group G2 in VLAN1 may send a multicast data packet.

The RB leaf24 may receive the multicast data packet, and may not find an entry matching with (VLAN1, G2). The RB leaf24 may configure a new (S2, G2, V1) entry, may add the port leaf24_P3 as an outgoing interface to the newly-configured (S2, G2, V1) entry, and may send the multicast data packet through the port leaf24_P3. The port leaf24_P3 is both the gateway router port and the DR router port corresponded to the multicast address G2 and the VLAN1.

The RB transit3 may receive the multicast data packet, and may not find an entry matching with (VLAN1, G2). The RB transit3 may configure a new (S2, G2, V1) entry, and may add the ports transit3_Pa and transit3_Pb, which are the gateway router ports and the DR router port, to an outgoing interface to the newly-configured (S2, G2, V1) entry.

The RB transit3 may send the multicast data packet by the ports transit3_Pa and transit3_Pb.

The RB core2 may receive the multicast data packet, and may not find an entry matching with the multicast address G2. The RB core2 may configure a (S2, G2, V1) entry, and may add membership information (VLAN1, core2_P3) to an outgoing interface of the newly-configured (S2, G2, V1) entry, in which VLAN1 may be a virtual local area network identifier (VLAN ID) of the multicast data packet, and the port core2_P3 is both the DR router port and the gateway router port.

The RB core1 may receive the multicast data packet, and may not find an entry matching with the multicast address G2. The RB core1 may configure a (S2, G2, V1) entry, and may add membership information (VLAN1, core1_P3) to an outgoing interface of the newly-configured (S2, G2, V1) entry, in which VLAN1 may be a VLAN ID of the multicast data packet, and the port core1_P3 is the gateway router port.

The RB core1, as the DR of the multicast group G2 in the VLAN1, may encapsulate the multicast data packet into a PIM register packet, and may send the PIM register packet to an upstream multicast router, i.e., an outgoing router 501. The outgoing router 501 may send the PIM register packet towards the RP router 502.

The RP router 502 may receive and decapsulate the PIM register packet to get the multicast data packet, and may send the multicast data packet to a receiver of the multicast G2 that is located outside of the data center. The RP router 202 may send, according to a source IP address of the PIM register packet, a PIM join packet to join the multicast group G2. The PIM join packet may be transmitted hop-by-hop to the outgoing router 501 of the data center. The outgoing router 501 may receive the PIM join packet, and may select the RB core2 from the RBs core1-core2, which are the next-hops of the VLAN1.

The outgoing router 501 may send a PIM join packet to the RB core2 to join the multicast group G2. In an example, the outgoing router 501 may perform HASH calculation according to the PIM join packet requesting to join the multicast group G2, and may select the next hop based on a result of the HASH calculation The RB core2 may receive, through a local port core2_Pout, the PIM join packet to join the multicast group G2, find the (S2, G2, V1) entry based on the multicast address G2, and add membership information (VLAN100, core2_Pout) to an outgoing interface of the matching entry, in which VLAN100 may be a VLAN ID of the PIM join packet, and the port core2_Pout may be a port receiving the PIM join packet.

In an example, if the next hop selected by the outgoing router 501 is the RB core1, the RB core1 may add associated VLAN ID and membership port according to the PIM join packet received.

The Client2' Joins a Multicast Group G2

In an example, the client2' which belongs to VLAN1 may send an IGMP report packet requesting to join the multicast group (*, G2).

The RB leaf24 may receive the IGMP report packet joining the multicast group G2 from the client2', find the (S2, G2, V1) entry matching with (VLAN1, G2), add a membership port leaf24_Pa to the outgoing interface of the matching entry.

The RB leaf24 may encapsulate a TRILL header and a next-hop header for the received IGMP report packet to encapsulate the IGMP report packet as a TRILL-encapsulated IGMP report packet, in which an ingress nickname of the TRILL header may be a nickname of the RB leaf24, and an egress nickname of the TRILL header may be a nickname of the RB core1 which is the DR of multicast group G2 in the VLAN1. The RB leaf24 may send the TRILL-encapsulated IGMP report packet through the DR router port leaf24_P3. The RB leaf24 configures an aging timer for the port leaf24_Pa.

The RB transit3 may receive the TRILL-encapsulated IGMP report packet and find the (S2, G2, V1) entry matching with the VLAN1 (the inner VLAN ID of the TRILL-encapsulated IGMP report packet) and the multicast address G2. The RB transit3 may add the port transit3_P4 as an outgoing interface. The RB transit3 may configure an aging timer for the port transit3_P4 which is a port receiving the TRILL-encapsulated IGMP report packet. The RB transit3 may send the TRILL-encapsulated IGMP report packet through the DR port transit3_Pa.

The RB core1 may receive the TRILL-encapsulated IGMP report packet, may find the (S2, G2, V1) entry matching with the multicast address G2. The RB core1 may determine that the membership information (VLAN1, core1_P3) is already existed in an outgoing interface. The RB core1 may not add the membership information (VLAN1, core1_P3) to the outgoing interface. The RB core1 may configure an aging timer for the port core1_P3 which is a port receiving the TRILL-encapsulated IGMP report packet.

The RB core1, as the DR of the multicast group G2 in the VLAN1, may send a PIM join packet based on the IP address of the RP router 502 to join the multicast group G2. The RB core1 may send the PIM join packet to an upstream multicast router, i.e., an outgoing router 501. The outgoing router 501 may configure a (S2, G2) entry based on the PIM join packet received and send the PIM join packet towards the RP router 502.

The Client3' Joins a Multicast Group G2

In an example, the client3' may send an IGMP report packet requesting to join the multicast group (*, G2).

The RB leaf24 may receive the IGMP report packet joining the multicast group G2 through the port leaf24_Pb, and may not find an entry matching with (VLAN2, G2). The RB leaf24 may configure a (*, G2, V2) entry, add the port leaf24_Pb (which is a port receiving the IGMP report packet) as a membership port to an outgoing interface of the newly-configured entry. The RB leaf24 may encapsulate the IGMP report packet as a TRILL-encapsulated IGMP report packet, in which an ingress nickname of a TRILL header may be a nickname of the RB leaf24, and an egress nickname of the TRILL header may be a nickname of the RB core2. The RB leaf24 may send the TRILL-encapsulated IGMP report packet through the DR router port leaf24_P4.

The RB leaf24 may configure an aging timer for the membership port leaf24_Pb which is the port receiving the IGMP report packet.

The RB transit4 may receive, through a local port transit4_P4, the TRILL-encapsulated IGMP report packet, and may not find an entry matching with (VLAN2, G2). The RB transit4 may configure a (*, G2, V2) entry, and add the port transit4_P4 (which is a port receiving the IGMP report packet) as a membership port to an outgoing interface of the newly-configured entry.

The RB transit4 may send, through DR router port transit4_Pb, the TRILL-encapsulated IGMP report packet.

The RB core2 may receive the TRILL-encapsulated IGMP report packet, find the (S2, G2, V1) entry based on the multicast address G2, and add membership information (VLAN2, core2_P4) to an outgoing interface of the matching entry, in which VLAN2 may be an inner VLAN ID of the TRILL-encapsulated IGMP report packet, and the port core2_P4 may be a membership port receiving the TRILL-encapsulated IGMP report packet. The RB core2 may configure an aging timer for the membership port core2_P4 which receives the TRILL-encapsulated IGMP report packet.

The RB core2, as the DR of the multicast group G2 in VLAN2, may send a PIM join packet based on the IP address of the RP router 502 to join the multicast group G2. The RB core2 may send the PIM join packet to an upstream multicast router, i.e., an outgoing router 501. The outgoing router 501 may configure a (S2, G2) entry based on the PIM join packet received and send the PIM join packet towards the RP router 502.

The Client4' Joins a Multicast Group G2

In an example, the client4' may send an IGMP report packet requesting to join the multicast group (*, G2).

The RB leaf25 may receive the IGMP report packet joining the multicast group G2 through the port leaf25_Pa. The RB leaf25 may not find an entry matching with (VLAN2, G2). The RB leaf25 may configure a (*, G2, V2) entry, add leaf25_Pa (which is a port receiving the IGMP report packet) as a membership port to an outgoing interface of the newly-configured entry.

The RB leaf25 may encapsulate the IGMP report packet as a TRILL-encapsulated IGMP report packet, in which an ingress nickname of a TRILL header may be a nickname of the RB leaf25, and an egress nickname of the TRILL header may be a nickname of the RB core2. The RB leaf25 may send the TRILL-encapsulated IGMP report packet through t the DR router port leaf25_P4. The RB leaf25 may configure an aging timer for the membership port leaf25_Pa which is the port receiving the TRILL-encapsulated IGMP report packet.

The RB transit4 may receive the TRILL-encapsulated IGMP report packet through the port transit4_P5, may find a (*, G2, V2) entry matching with (VLAN2, G2). The RB transit4 may add the port transit4_P5 (which is the port received the TRILL-encapsulated IGMP report packet) as a membership port to an outgoing interface.

The RB transit4 may send the TRILL-encapsulated IGMP report packet through the DR router port transit4_Pb.

The RB core2 may receive the TRILL-encapsulated IGMP report packet, may find the (S2, G2, V1) entry matching with the multicast address G2. The RB core2 may determine that the membership information (VLAN2, core2_P4) is already existed in the outgoing interface. The RB core2 may not add the membership information (VLAN2, core2_P4) to the outgoing interface. The RB core2 may reset an aging timer for the port core2_P4.

Figure 9:
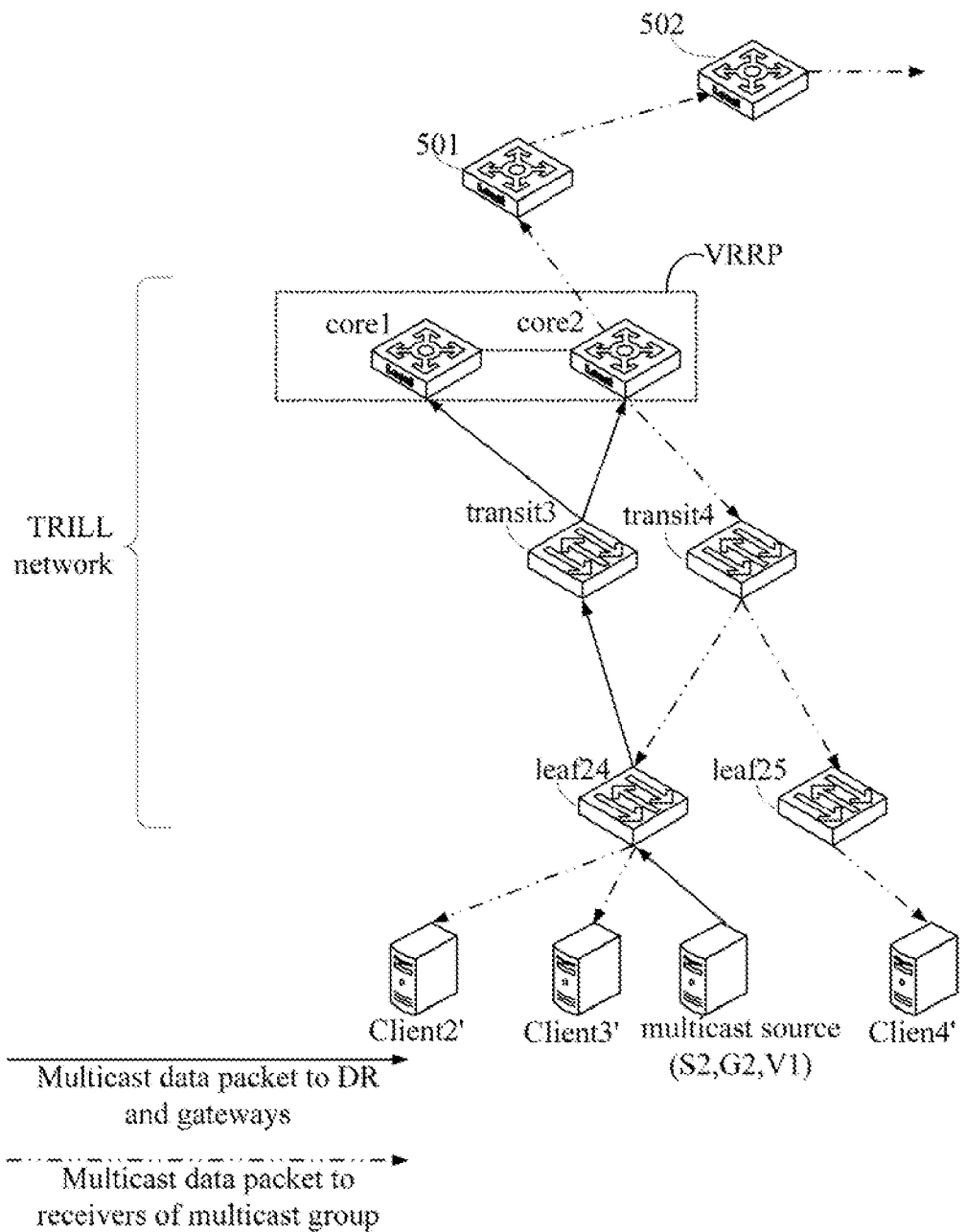
FIG. 9 is a schematic diagram illustrating a process of sending a multicast data packet of an internal multicast source in FIG. 6 to an external RP router and an internal multicast group receiving end, according to an example of the present disclosure.

FIG. 9 is a schematic diagram illustrating a process of sending a multicast data packet of an internal multicast source in FIG. 6 to an external RP router and an internal multicast group receiving end, according to an example of the present disclosure.

The multicast source (S2, G2, V1) of the multicast group G2—may send a multicast data packet to the RB leaf24. The RB leaf24 may receive the multicast data packet, and may find an entry matching with (VLAN1, G2). The RB leaf24 may send the multicast data packet to the client2' and the RB transit3 through the membership port leaf24_Pa and the router port leaf24_P3 (which is both the DR router port and gateway router port), respectively.

The RB transit3 may receive the multicast data packet, find a (S2, G2, V1) entry matching with (VLAN1, G2), and send the multicast data packet through the router ports transit3_Pa (which is both the DR router port and gateway router port) and Transit3_Pb (which is the DR router port and gateway router port).

The RB core1 may receive the multicast data packet, encapsulate the multicast data packet into a PIM register packet, and may send the PIM register packet to the RP router 502.

The RB core2 may receive the multicast data, and find the (S2, G2, V1) entry based on the multicast address G2. The RB core2 may duplicate and send the multicast data packet of the multicast group G2 based on the membership information (VLAN2, core2_P4) and (VLAN100, core2_Pout). The RB core2 may send the multicast data packet of the multicast group G2 to the RB transit4 and the outgoing router 501. According to an outgoing interface of a (S2, G2) entry, the outgoing router 501 may send the multicast data packet towards the RP router 502.

The RB transit4 may send the multicast data packet, through the membership ports transit4_P4 and transit4_P5 in its entry, to the RB leaf24 and RB leaf25.

The RB leaf24 may receive the multicast data packet of the multicast group G2, and may find an entry matching with (VLAN2, G2). The RB leaf24 may send the multicast data packet of the multicast group G2 to the client3' through the membership port leaf24_Pb.

The RB leaf25 may receive the multicast data packet of the multicast group G2, and may find an entry matching with (VLAN2, G2). The RB leaf25 may send the multicast data packet of the multicast group G2 to the client4' through the membership port leaf25_Pa.

The RP router 502 may receive the multicast data packet, and send a PIM register-stop packet of the multicast group G2 to the RB core1. The RB core1 may receive the PIM register-stop packet, and may no longer send PIM register packet to the RP router 502.

Processing for Responding to an IGMP General Group Query Packet

The RBs core1-core2 may elect an IGMP querier for each VLAN. However, IGMP queriers elected for different VLANs may be implemented by the same gateway RB. In an example, the RBs core1-core2 may elect the RB core1 as an IGMP querier within the VLAN1, and may elect the RB core2 as an IGMP querier within the VLAN2.

In the example, the RBs core1 and core2 each may periodically send an IGMP general group query packet within the VLAN1 and the VLAN2, respectively. In order to reduce network bandwidth overhead in the TRILL domain, the RB core1 and the RB core2 each may select a TRILL VLAN pruned tree to send the IGMP general group query packet, so as to ensure that the RBs transit1-transit4 and the RBs leaf21-leaf26 may respectively receive the IGMP general group query packet within the VLAN1 and the VLAN2.

In an example, the RB core1 may send a TRILL-encapsulated IGMP general group query packet to the VLAN1, in which an ingress nickname may be a nickname of the RB core1, and an egress nickname may be the nickname of the RB core1, which is the root of the TRILL VLAN pruned tree of the VLAN1.

The RB core2 may send a TRILL-encapsulated IGMP general group query packet to the VLAN2, in which an ingress nickname may be a nickname of the RB core2, and an egress nickname may be the nickname of the RB core2, which is the root of the TRILL VLAN pruned tree of the VLAN2.

The RBs transit1-transit4 may receive the TRILL-encapsulated IGMP general group query packet, and may respectively send the IGMP general group query packet based on the nickname of the egress nickname. The RBs leaf21-leaf26 each may receive the TRILL-encapsulated IGMP general group query packet, and may decapsulate the TRILL-encapsulated IGMP general group query packet. The RBs leaf21-leaf26 may send the IGMP general group query packet through local ports of the VLAN1 and local ports of the VLAN2, respectively.

Processing of the Client2' Responded the IGMP General Group Query Packets

In an example, the client2' may send, in response to receiving the IGMP general group query packet, an IGMP report packet. The RB leaf24 may receive, through the port leaf24_Pa, the IGMP report packet joining the multicast G2, may reset the aging timer of membership port leaf24_Pa, may perform TRILL encapsulation to the IGMP report packet, and may send the TRILL-encapsulated IGMP report packet to the RB transit3 through the DR router port leaf24_P3.

The RB transit3 may receive the TRILL-encapsulated IGMP report packet, and reset the aging timer of the port transit3_P4. The RB transit3 may send the TRILL-encapsulated IGMP report packet through the DR router port transit3_Pa to the RB core1.

The RB core1 may receive the TRILL-encapsulated IGMP report packet and reset the aging timer of the port core1_P3.

Processing of the Client3 for Leaving a Multicast Group

In an example, the client3' may send an IGMP leave packet.

The RB leaf24 may receive the IGMP leave packet from the client3', perform TRILL encapsulation to the IGMP leave packet, and forward the TRILL-encapsulated IGMP leave packet through the DR router port leaf24_P4.

The RB transit4 may receive the TRILL-encapsulated IGMP leave packet and may forward the TRILL-encapsulated IGMP leave packet through the DR router port transit4_Pb to the RB core2.

The RB core2 may receive the TRILL-encapsulated IGMP leave packet through the port core2_P4, and generate, based on the IGMP leave packet, an IGMP group specific query packet about the multicast group G2 and VLAN2. The RB core2 may perform TRILL encapsulation to the IGMP group specific query packet, send the TRILL-encapsulated IGMP group specific query packet through the port core2_P4, which is the port receiving the TRILL-encapsulated IGMP leave packet, and may reset the aging timer of the port core2_P4.

The RB transit4 may receive the TRILL-encapsulated IGMP group specific query packet, and send the TRILL-encapsulated IGMP group specific query packet through the membership port transit4_P4 of an outgoing interface of the (*, G2,V2) entry which matches the VLAN2 and the multicast address G2.

The RB leaf24 may receive the TRILL-encapsulated IGMP group specific query packet, and analyze the IGMP group specific query packet to determine that the multicast group G2 in VLAN2 is to be queried. The RB leaf24 may send the IGMP group specific query packet through the port leaf24_Pb, which is the membership port of the outgoing interface of the (*, G2, V2) entry matching with the (VLAN2, G2). The RB leaf24 may reset a multicast group membership aging timer of the port leaf24_Pb.

The RB leaf24 may remove, in response to a determination that an IGMP report packet joining the group G2 is not received through the membership port leaf24_Pb within the configured time, the membership port leaf24_Pb from the (*, G2, V2) entry.

The RB transit4 may remove, in response to a determination that an IGMP report packet joining the group G2 is not received through the membership port transit4_P4 within the configured time, the membership port transit4_P4 from the (*, G2, V2) entry, and may keep remaining router ports in the entry.

The RB core2 may remove, in response to a determination that an IGMP report packet joining the group G2 is not received within the configured time, the member information (VLAN2, core2_P4) of the outgoing interface in the (S2, G2, V1) entry.

In an example, when the upstream PIM link of the RB core1 is failed, the RB core1 may turn off the PIM neighbor relationships between the RB core1 and PIM neighbors outside the data center. The RB core1 may immediately turn off all the IGMP functions and PIM multicast routing functions of downstream. The IGSP function of the VLAN may be remained to meet the needs for the transit nodes listening and maintaining the other router ports. The RB core2 may switch to the DR of multicast group G2 in VLAN1.

Or, when the RB core1 is failed, the RB core2 may detect that the RB core1 is failed by the BFD detection, and may switch to the DR of multicast group G2 in VLAN1.

The RB core2 may notify, in TRILL network, the RB core1 which is the gateways of the VLAN1 and the VLAN2 is failed, the multicast source of the multicast group G2 is located inside the VLAN1 of the data center, and a nickname of a DR of the multicast group G2 in the VLAN1 may be the nickname of the RB core2.

The RB core2, the RBs transit1-transit4, and the RBs leaf21-leaf26 may respectively recalculate a TRILL multicast tree of which a root is the RB core2.

The method of the present disclosure as shown in FIG. 6 to FIG. 9 applies to the IGMP v2 protocol and the IGMP v3 protocol.

In the TRILL network as shown in FIG. 6, the RBs core1 and core2 may have a plurality of nicknames, and may assign a different nickname to a nickname of a gateway for different VALNs, and may assign a different nickname to a nickname of a DR of a multicast group for different VALN.

The above examples of the present disclosure may be applied to the gateway RBs core11-core2 at the core layer under the PIM Source Specific Multicast (PIM-SSM) and the IGMP v3 TRILL protocol. Under the IGMP v3/PIM-SSM environment, the RBs core1-core2 are still be handled in accordance with depicts shown in FIG. 6 to FIG. 9.

The RBs leaf21-leaf26 at the access layer may enable the analysis functionality of packet. The RBs leaf21-leaf26 may split the IGMP report packet carrying a plurality of group records into different IGMP report packet based on different roots of different multicast trees, and may be encapsulate each multicast different IGMP report packet into a TRILL-encapsulated IGMP report packet and may send to each TRILL-encapsulated IGMP report packet through one corresponding DR router port.

Figure 10:
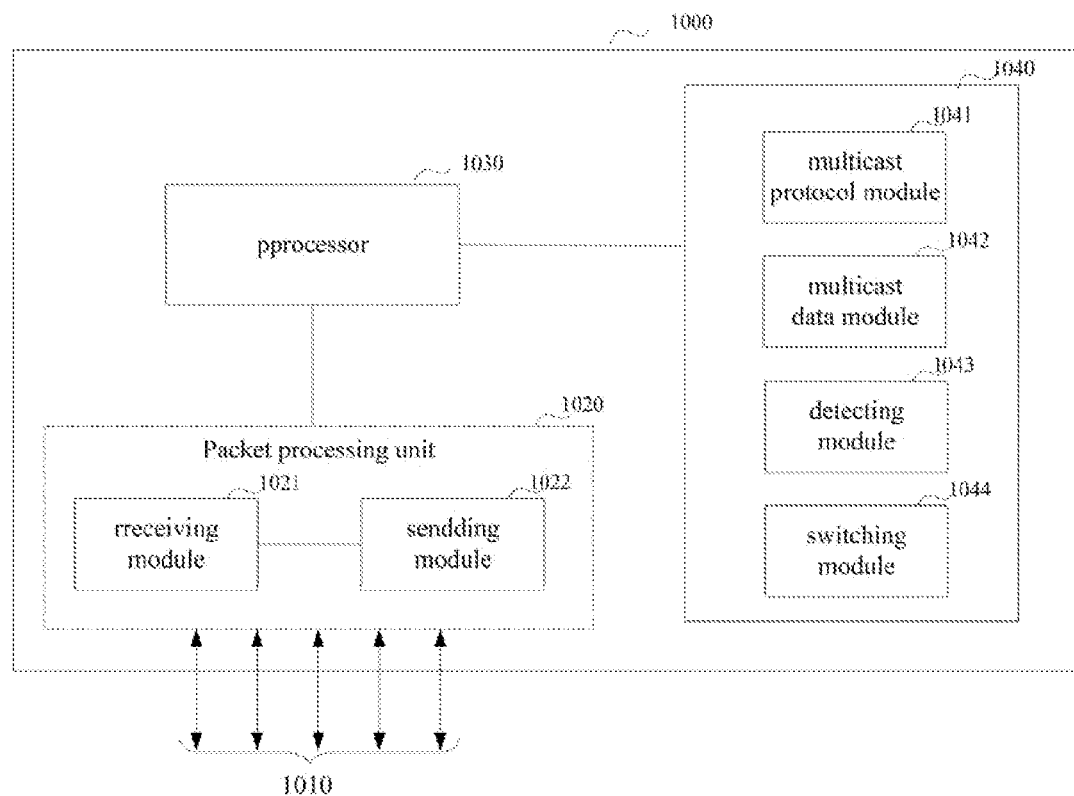
FIG. 10 is a schematic diagram illustrating the structure of a network apparatus, according to an example of the present disclosure.

An example of the present disclosure also provides a routing bridge used as gateway routing bridge in a data center, as shown in FIG. 10. The routing bridge 1000 may include ports 1010, a packet processing unit 1020, a processor 1030, and a storage unit 1040. The packet processing unit 1020 may transmit data packets and protocol packets received via the ports 1010 to the processor 1030 for processing, and may transmit data packets and protocol packets from the processor 1030 to the ports 1010 for forwarding. The packet processing unit 1020 includes a receiving module 1021 and a sending module 1022. The receiving module 1021 and the sending module 1022 may be implemented by hardware, for instance by hardware circuitry of an application specific integrated chip (ASIC), field programmable gate array (FPGA), or by a processor executing machine readable instructions. When implemented by an ASIC or FPGA, the receiving module 1021 and sending module 1022 may be implemented by separate hardware devices or as separate modules of a single hardware device. The storage 1040 includes program modules to be executed by the processor 1030, in which the program modules may include: a multicast protocol module 1041, a multicast data module 1042, a detecting module 1043 and a switching module 1044. In one example the packet processing unit 1020 is implemented by a hardware chip such as an ASIC or FPGA, while the program modules are machine readable instructions stored in a non-transitory storage medium provided by the storage unit and executable by a processor.

The multicast protocol module 1401 may obtain nicknames of designated routers (DR) of a multicast group in each virtual local area network (VLAN), and calculate distribution trees rooted at each DR. The receiving module 1021 may receive a multicast data packet from a multicast source of the multicast group inside the data center. The sending module 1022 may send multicast data packet on the distribution tree rooted at the DR which corresponds to a multicast address and a VLAN identifier (VLAN ID) of the multicast data packet The sending module 1022 may send the multicast data packet through a designated router (DR) router port matching with the multicast address and the VLAN ID identified in the multicast data packet when an incoming interface of the multicast data packet is different with the DR router port; and may send the multicast data packet through a gateway router port matching with the multicast address and the VLAN ID identified in the multicast data packet when the incoming interface of the multicast data packet is different with the gateway router port.

The receiving module 1021 may receive a transparent interconnection of lots of links (TRILL)-encapsulated IGMP report packet in which a multicast address and an inner VLAN ID correspond to the distribution tree rooted at the gateway routing bridge. The multicast protocol module 1041 may store a receiving port and the inner VLAN ID of the TRILL-encapsulated IGMP report packet as a membership information matching with the multicast address in the TRILL-encapsulated IGMP report packet.

The sending module 1022 may duplicate and send the multicast data packet based on a membership port and a VLAN ID in a membership information matching with the multicast address of the multicast data packet to send the multicast data packet on the distribution tree rooted at the gateway routing bridge.

The multicast protocol module 1041 may elect an IGMP querier for each virtual local area network (VLAN), and generate a TRILL-encapsulated IGMP general group query packet when the gateway routing bridge is elected to be an IGMP querier of a virtual local area network (VLAN) periodically. The sending module 1022 may send the TRILL-encapsulated IGMP general group query packet based on a TRILL VLAN pruned tree.

The receiving module 1021 may receive a TRILL-encapsulated leave group packet. The multicast protocol module 1041 may generate a TRILL-encapsulated IGMP group specific query packet based on a multicast address and a inner VLAN ID of the TRILL-encapsulated leave group packet when the gateway routing bridge is the DR corresponding to the multicast address and the inner VLAN ID of the TRILL-encapsulated leave group packet. The sending module 1022 may send the TRILL-encapsulated IGMP group specific query packet through a membership port in a membership information corresponding to the multicast address and the inner VLAN ID of the TRILL-encapsulated IGMP group specific query packet.

The multicast protocol module 1041 may remove a membership information when no TRILL-encapsulated IGMP report packet is received through its membership port within a configured aging time; and keep a membership port when an IGMP report packet is received is received through its membership port within a configured aging time.

The detecting module 1043 may detect a status of a DR. The switching module may switch the gateway routing bridge apparatus to be a DR when the gateway routing bridge is a backup DR of a failed DR the multicast protocol module 1041 may encapsulate the multicast data packet into a protocol independent multicast (PIM) register packet when the gateway routing bridge is the DR which corresponds to the multicast address and the VLAN ID of the multicast data packet. The sending module 1022 may send the PIM register packet to a rendezvous point (RP) router outside the data center.

The reviving module 1021 may receive a PIM join packet from a PIM neighbour outside the data center. The multicast protocol module 1041 may store a receiving port and a VLAN ID of the PIM join packet as a membership information matching with the multicast address in the PIM join packet. The sending module 1022 may duplicate and send the multicast data packet based on the membership information which is stored according to the PIM join packet.

In one example, the receiving module 1021 may receive gateway information of each VLAN, DR information of the multicast group in each VLAN, multicast source information. The multicast protocol module 1041 may calculate the TRILL multicast trees rooted at each DR, and calculate DR router ports and gateway router ports based on each TRILL multicast tree. Then, the processor 1030 may notify the packet processing unit 1020 the calculated DR router ports and gateway router ports.

In one example, when the receiving module 1021 receives multicast data packets from the multicast source inside a data center, the packet processing unit 1020 may send an initial multicast data packet of the received multicast data packet to the processor 1030. The multicast data module 1042 may configure a new multicast entry, and may add the DR router port and the gateway router port to the configured multicast entry as outgoing interface. The processor 1030 may synchronize the multicast entry to the packet processing unit 1020. Then, the sending module 1022 may send the received multicast data packets through the DR router port and the gateway router port.

In one example, when the receiving module 1021 receives the TRILL-encapsulated IGMP report packet, the packet processing unit 1020 may send the TRILL-encapsulated IGMP report packet to the processor 1030. The multicast protocol module 1041 may configure a new multicast entry or find a matching multicast entry which matches with multicast address and the inner VLAN ID of the TRILL-encapsulated IGMP report packet, and may store the receiving port and the inner VLAN ID of the TRILL-encapsulated IGMP report packet as a membership information in the new or the founded multicast entry. The processor 1030 may synchronize the new or the founded multicast entry to the packet processing unit 1020. When the receiving module 1021 receives multicast data packets from the multicast source, the sending module 1022 may duplicated and send the multicast data packets through the membership port in the membership information.

The above examples of the present disclosure may be illustrated taking the TRILL technology within a data center as an example, relevant principles may also be applied to other VLL2 networking technologies, such as virtual extended virtual local area network (Vxlan) protocol (a draft of the IETF), the SPB protocol, and so forth. In the present disclosure, the client may be a host and the network apparatus may be a virtual machine.

It should be noted that examples of the present disclosure described above may be illustrated taking the IGMP protocol, the IGSP protocol, and the PIM protocol as an example. The above protocols may also be replaced with other similar protocols, under this circumstance, the multicast forwarding solution provided by the examples of the present disclosure may still be achieved, and the same or similar technical effects may still be achieved, as well.

In the present disclosure, the apparatus of a data center may maintain the router ports base on the VLAN and the TRILL multicast trees corresponding to the multicast group, and may no longer maintain the router ports base on the mechanism of the IGMP packet.

The processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or block, or group of elements, integers or blocks, but not the exclusion of any other element, integer or block, or group of elements, integers or blocks.

The invention claimed is:

1. A method for forwarding multicast data packet, which is used in a gateway routing bridge of a data center, the method comprising:
obtaining nicknames of designated routers (DR) of a multicast group in each virtual local area network (VLAN);
calculating distribution trees rooted at each DR;
receiving a multicast data packet from a multicast source of the multicast group which inside the data center; and
sending the multicast data packet on the distribution tree rooted at the DR which corresponds to a multicast address and a VLAN identifier (VLAN ID) of the multicast data packet from the multicast source.

2. The method of the claim 1, wherein the sending the multicast data packet on the distribution tree rooted at the DR which corresponds to a multicast address and a VLAN identifier (VLAN ID) of the multicast data packet from the multicast source comprises:
sending the multicast data packet through a designated router (DR) router port matching with the multicast address and the VLAN ID identified in the multicast data packet when an incoming interface of the multicast data packet is different with the DR router port;
sending the multicast data packet through a gateway router port matching with the multicast address and the VLAN ID identified in the multicast data packet when the incoming interface of the multicast data packet is different with the gateway router port.

3. A method according to claim 1, further comprising:
receiving a transparent interconnection of lots of links (TRILL)-encapsulated IGMP report packet in which a multicast address and an inner VLAN ID correspond to the distribution tree rooted at the gateway routing bridge;
storing a receiving port and the inner VLAN ID of the TRILL-encapsulated IGMP report packet as a membership information matching with the multicast address in the TRILL-encapsulated IGMP report packet.

4. A method according to claim 3, further comprising:
duplicating and sending the multicast data packet based on a membership port and an VLAN ID in a membership information matching with the multicast address of the multicast data packet to send the multicast data packet on the distribution tree rooted at the gateway routing bridge.

5. A method according to claim 1, further comprising:
electing an IGMP querier for each virtual local area network (VLAN); generating a TRILL-encapsulated IGMP general group query packet when the gateway routing bridge is elected to be an IGMP querier of a virtual local area network (VLAN) periodically; and sending a TRILL-encapsulated IGMP general group query packet based on a TRILL VLAN pruned tree.

6. A method according to claim 1, further comprising:
receiving a TRILL-encapsulated leave group packet;
generating a TRILL-encapsulated IGMP group specific query packet based on a multicast address and a inner VLAN ID of the TRILL-encapsulated leave group packet when the gateway routing bridge is the DR corresponding to the multicast address and the inner VLAN ID of the TRILL-encapsulated leave group packet;
sending the TRILL-encapsulated IGMP group specific query packet through a membership port in a membership information corresponding to the multicast address and the inner VLAN ID of the TRILL-encapsulated IGMP group specific query packet.

7. A method according to claim 1, further comprising:
removing a membership information when no TRILL-encapsulated IGMP report packet is received through its membership port within a configured aging time;
keeping a membership port when an IGMP report packet is received is received through its membership port within the configured aging time.

8. A method according to claim 1, further comprising:
detecting a status of a DR; and
switching the gateway routing bridge apparatus to be a DR when the gateway routing bridge is a backup DR of a failed DR.

9. A method according to claim 1, further comprising:
encapsulating the multicast data packet into a protocol independent multicast (PIM) register packet when the gateway routing bridge is the DR which corresponds to the multicast address and the VLAN ID of the multicast data packet from the multicast source;
sending the PIM register packet to a rendezvous point (RP) router outside the data center;
receiving a PIM join packet from a PIM neighbour outside the data center; and
storing a receiving port and a VLAN ID of the PIM join packet as a membership information matching with the multicast address in the PIM join packet;
duplicating and sending the multicast data packet based on the membership information which is stored according to the PIM join packet.

10. A multicast data packet forwarding apparatus which is used as a gateway routing bridge of a data center, comprising:
a multicast protocol module is to obtain nicknames of designated routers (DR) of a multicast group in each virtual local area network (VLAN), and to calculate distribution trees rooted at each DR;
a receiving module is to receive a multicast data packet from a multicast source of the multicast group which inside the data center; and
a sending module is to send the multicast data packet on the distribution tree rooted at the DR which corresponds to a multicast address and a VLAN identifier (VLAN ID) of the multicast data packet from the multicast source.

11. An apparatus according to claim 10, wherein the sending module is further to send the multicast data packet through a designated router (DR) router port matching with the multicast address and the VLAN ID identified in the multicast data packet when an incoming interface of the multicast data packet is different with the DR router port, and to send the multicast data packet through a gateway router port matching with the multicast address and the VLAN ID identified in the multicast data packet when the incoming interface of the multicast data packet is different with the gateway router port.

12. An apparatus according to claim 10, wherein the receiving module is further to receive a transparent interconnection of lots of links (TRILL)-encapsulated IGMP report packet in which a multicast address and an inner VLAN ID correspond to the distribution tree rooted at the gateway routing bridge;

the multicast protocol module is further to store a receiving port and the inner VLAN ID of the TRILL-encapsulated IGMP report packet as a membership information matching with the multicast address in the TRILL-encapsulated IGMP report packet.

13. An apparatus according to claim 10, wherein the sending module is further to duplicate and send the multicast data packet based on a membership port and an VLAN ID in a membership information matching with the multicast address of the multicast data packet to send the multicast data packet on the distribution tree rooted at the gateway routing bridge.

14. An apparatus according to claim 10, wherein the multicast protocol module is further to elect an IGMP querier for each virtual local area network (VLAN), and generate a TRILL-encapsulated IGMP general group query packet when the gateway routing bridge apparatus is elected to be an IGMP querier of a virtual local area network (VLAN) periodically;

the sending module is further to send the TRILL-encapsulated IGMP general group query packet based on a TRILL VLAN pruned tree.

15. An apparatus according to claim 10, wherein the receiving module is further to receive a TRILL-encapsulated leave group packet;

the multicast protocol module is further to generate a TRILL-encapsulated IGMP group specific query packet based on a multicast address and a inner VLAN ID of the TRILL-encapsulated leave group packet when the gateway routing bridge is the DR corresponding to the multicast address and the inner VLAN ID of the TRILL-encapsulated leave group packet;

the sending module is further to send the TRILL-encapsulated IGMP group specific query packet through a membership port in a membership information corresponding to the multicast address and the inner VLAN ID of the TRILL-encapsulated IGMP group specific query packet.

16. An apparatus according to claim 10, wherein the multicast protocol module is further to remove a membership information when no TRILL-encapsulated IGMP report packet is received through its membership port within a configured aging time; and keep a membership port when an IGMP report packet is received is received through its membership port within a configured aging time.

17. An apparatus according to claim 10, further comprises:

a detecting module is to detect a status of a DR; and a switching module is to switch the gateway routing bridge apparatus to be a DR when the gateway routing bridge is a backup DR of a failed DR.

18. An apparatus according to claim 10, wherein the multicast protocol module is further to encapsulate the multicast data packet into a protocol independent multicast (PIM) register packet when the gateway routing bridge is the DR which corresponds to the multicast address and the VLAN ID of the multicast data packet;

the sending module is further to send the PIM register packet to a rendezvous point (RP) router outside the data center;

the receiving module is further to receive a PIM join packet from a PIM neighbour outside the data center; and the multicast protocol module is further to store a receiving port and a VLAN ID of the PIM join packet as a membership information matching with the multicast address in the PIM join packet;

the sending module is further to duplicate and send the multicast data packet based on the membership information which is stored according to the PIM join packet.

* * * * *